(12) United States Patent
Coleman et al.

(10) Patent No.: US 9,262,782 B2
(45) Date of Patent: Feb. 16, 2016

(54) SECURE TRANSACTION PROCESSING SYSTEM AND METHOD

(75) Inventors: Christopher Lee Coleman, Lewisville, TX (US); Carl Christopher Tierney, Dallas, TX (US)

(73) Assignee: Doing Good Better, LLC, Sunnyvale, TX (US)

(*) Notice: Subject to any disclaimer, the term of this patent is extended or adjusted under 35 U.S.C. 154(b) by 0 days.

(21) Appl. No.: 13/420,364

(22) Filed: Mar. 14, 2012

(65) Prior Publication Data

US 2013/0246266 A1 Sep. 19, 2013

(51) Int. Cl.
*G06Q 20/40* (2012.01)
*G06Q 30/06* (2012.01)
*G06Q 20/02* (2012.01)

(52) U.S. Cl.
CPC .......... *G06Q 30/0641* (2013.01); *G06Q 20/023* (2013.01)

(58) Field of Classification Search
None
See application file for complete search history.

(56) References Cited

U.S. PATENT DOCUMENTS

| | | | |
|---|---|---|---|
| 2009/0037806 A1* | 2/2009 | Yang | H04L 67/34 715/234 |
| 2009/0327421 A1* | 12/2009 | Fu | G06F 17/3089 709/204 |
| 2010/0281107 A1* | 11/2010 | Fallows | G06F 9/54 709/203 |
| 2011/0161201 A1* | 6/2011 | Stocker | G06Q 20/12 705/27.1 |

* cited by examiner

*Primary Examiner* — Jason M. Borlinghaus
*Assistant Examiner* — Ambreen A Alladin
(74) *Attorney, Agent, or Firm* — David W. Carstens; Carstens & Cahoon, LLP

(57) ABSTRACT

A secure transaction processing system/method allowing injection and execution of credit card and ACH payment forms in a third party web page via cross domain requests is disclosed. The system/method provides a mechanism to inject and execute payment forms into a third (customer) party's website via Cross Domain Requests by providing a set of client application instructions that retrieves presentation and behavior logic and delivers it in a third party application. A browser based client application detects and manages style and behavior conflicts to render forms within in an existing third party web page. The client application then submits the forms via Cross Domain Requests to the transaction processing web server and directs the client application to a new navigation target within the third party website.

18 Claims, 24 Drawing Sheets

FIG. 8 — Prior Art

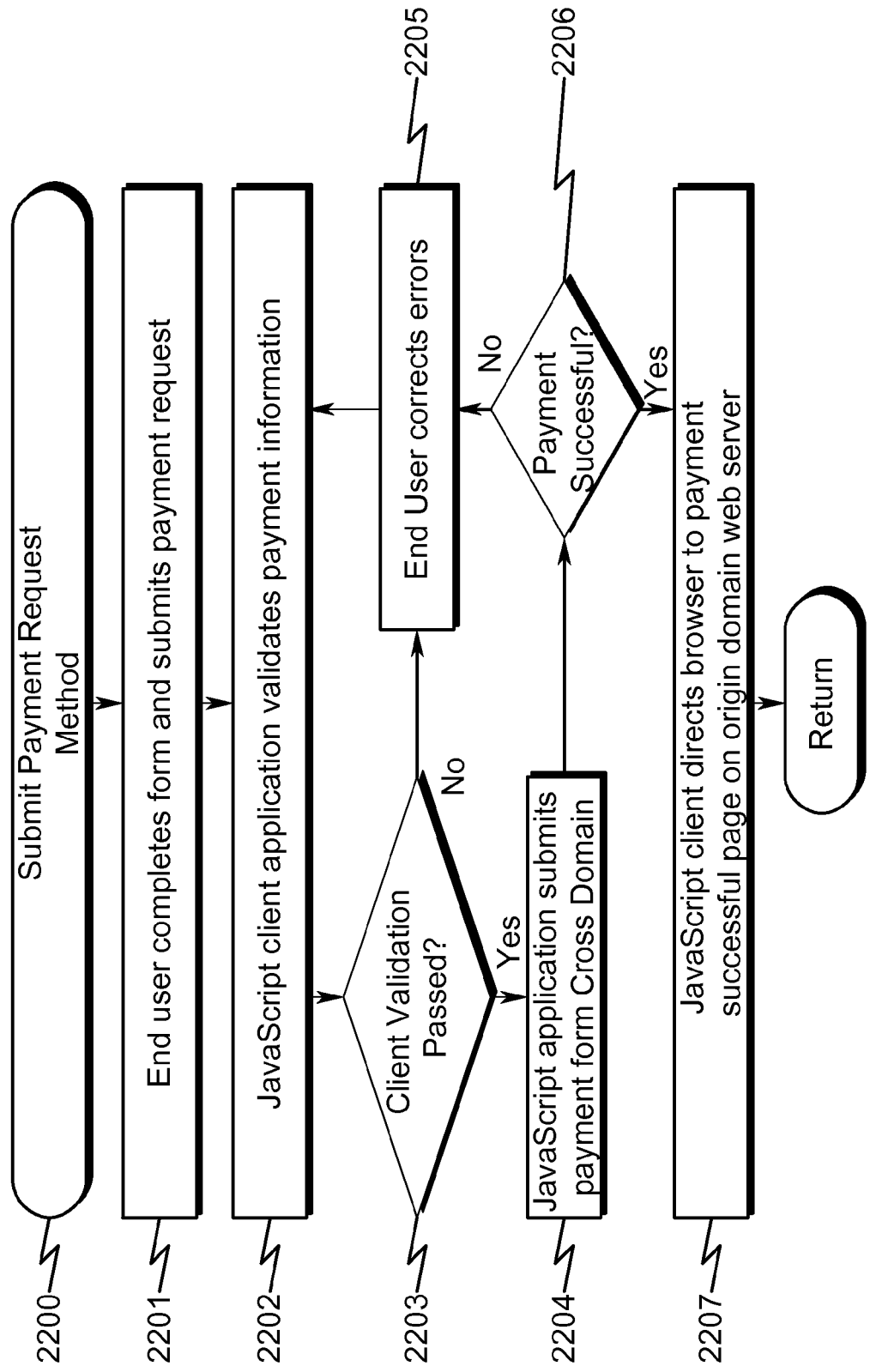

FIG. 23

2300
Exemplary Secure Transaction Processing HTML Insertion

```
<link href="http://demo.v2s.me/api/css/v2s.css" rel="stylesheet" />
<div class="V2S" id="v2SGiving"></div>
<script src="http://demo.v2s.me/API/js/src/ClientRoutes.js" type="text/javascript"></script>
<script src="http://demo.v2s.me/API/js/v2s.js" type="text/javascript"></script>
<script type="text/javascript">V2S.Init({ load: V2S.giving });</script>
```

SECURE TRANSACTION PROCESSING SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to secure transaction processing systems/methods and generally includes operations related to credit card, debit card, and/or ACH transactions.

PRIOR ART AND BACKGROUND OF THE INVENTION

Prior Art System Context (0100)

As generally depicted in the system block diagram of FIG. 1 (0100), the prior art describes a typical system that could be used to implement embedded payment processing or web redirection based payment processing. An end user (0101) interacts with a Graphical User Interface (GUI) (0102) to under control of a computer system (0103) running application/system software read from a computer readable medium (0104) to access a communication network (Internet, etc.) (0120). A web page (0131) is requested from a web server (0130) which is displayed in the Graphical User Interface (GUI) (0102). The web page (0131) may contain a payment form (0132) that can be submitted back to the web server (0130) that is then sent to the payment processor (0141).

Overview of Prior Art Payment Systems (0200)

As generally illustrated in FIG. 2 (0200), currently many of the available mechanisms for organizations to receive and process payments on their website require one of the following:

Installation of application software on the webserver that is providing the web content related to the payment or purchase (0230); or Redirection to a third party website for processing the transaction with minimal ability to manage the styling related to that website (0240).

These two options currently dictate cost/implementation effort/aesthetic tradeoffs that are a significant burden to the implementation of a secure transaction processing subsystem within any typical website development.

Integrated HTML Implementation

The use of an integrated HTML transaction processing system (0230) generally utilizes an origin web page (0231) that is augmented with significant integrated transaction code (0232) to form an integrated web page (0233) for presentation to the user (0201) using the GUI (0202) via the computer system (0203) over the communication network (0210). The implementation burden here is significant in that the software development necessary to implement the integrated transaction processing component (0232) is daunting and beyond the reach of many code developers or owners of origin websites.

Web Redirection Implementation

The alternative to an integrated web page (0230) implementation is an implementation using web redirection (0240) in which the origin web page (0241) interacts with an external transaction processing website (0242) in a configuration where the origin web page (0243) references a hyperlink that invokes the external web page (0244) to handle the financial transaction. The drawback here is that the origin web page (0241) completely loses control of the user interface when the external web page (0244) is invoked from the origin web page (0243). This invocation results in a complete loss of visual "look and feel" of the origin website and may trigger fears by the user (0201) that the remote website (0244) is not to be trusted. This loss of visual control makes this form of transaction processing very problematic in situations where large scale financial transactions must be processed by an origin web page (0243) that lacks the financial resources to implement a fully integrated web page (0230) approach.

Embedded Payment Request Processing (0300)

FIG. 3 (0300) generally illustrates embedded transaction processing architectures known in the prior art. As generally depicted in FIG. 3 (0300), a sending receiving entity (0310) can be any device that has an AJAX capable web browser (0311) such as a mobile phone (0312), a tablet (0313), a laptop or desktop (0314). A sending receiving entity (0310) communicates with a web server (0330) via network communication (0320) to request (0321) web pages (0331) and to make payment requests (0322). The payment requests are handled by a payment server component (0332) which could be a software product or custom written software to integrate with a third party payment service (0334) on a third party payment gateway (0333) which actually handles the processing of the payment.

Embedded Payment Request Processing Implementation (0400)

FIG. 4 (0400) generally illustrates the methodology involved in implementing an embedded transaction processing system as depicted in FIG. 3 (0300). FIG. 4 (0400) generally illustrates by example how an organization might configure embedded payment request processing by first establishing a PCI compliant infrastructure (0401). Once the PCI compliant infrastructure (0401) is established the organization has to install their payment components in the PCI compliant infrastructure (0402) and integrate them with their website (0403). Once the integration is complete the organization must on an ongoing basis pay to have their infrastructure audited for PCI compliance (0404). This initial and ongoing implementation burden is both costly and time consuming.

Embedded Payment Request Processing Method (0500)

An example of how an organization might process an embedded payment request is generally illustrated in FIG. 5 (0500) and would start with a browser requesting a web page with a payment form (0501). The origin domain web server would return the payment form web page to the browser (0502). The end user would complete the form and submit the payment request to the origin domain web server (0503). The origin web server would then send the payment request to the payment service for processing (0504). The payment service would process the payment and return a response to the origin web server (0505). The origin web server would then return a page with payment request status information to the web browser (0506). Within this integrated payment processing system the "look and feel" of the origin domain web page is generally maintained.

Web Redirection Payment Request Processing (0600)

The alternative to embedded/integrated transaction processing systems as previously discussed is the use of web redirection payment processing systems as is depicted in FIG. 6 (0600). As generally illustrated in FIG. 6 (0600), the web redirection payment request processing typically involves a sending receiving entity (0610) that can be any device that has an AJAX capable web browser (0611) such as a mobile phone (0612), a tablet (0613), a laptop or desktop (0614). A sending receiving entity (0610) makes web page requests (0621) using an AJAX enabled browser (0611) through a network connection (0620) to view a web page (0631) that is hosted on an organization web server (0630). When the sending receiving entity (0610) requests a web page that is for payment purposes, the origin domain web server returns a payment server redirect response (0632). The payment server redirect response (0632) tells the browser (0611) to request (0651) a payment web (0641) page from the payment web server (0640). In some cases this payment web page redirection can be delivered via an IFRAME or a modal dialog within the browser (0611). The sending receiving entity then submits the payment to the payment web server (0640) for processing. Within this context the origin domain web page (0631) has little or no control over the visual formatting or "look and feel" associated with the payment web page (0641).

Web Redirection Payment Request Processing Implementation (0700)

From an implementation perspective, the typical methodology associated with creating a web redirection payment processing infrastructure is generally illustrated in FIG. 7 (0700). This exemplary method of configuring a web payment request processing system starts with creating a web page on the origin domain web server which will redirect the browser to the payment web server (0701). Then a web page that understands how to react to a call back from the payment web server is created and placed on the origin domain web server that displays the payment processing status (0702).

Web Redirection Payment Request Processing Method (0800)

The exemplary method of executing a web redirection payment processing request is generally illustrated in FIG. 8 (0800) and starts with the end user using their browser to request a web page from the origin domain web server to make a payment (0801). The origin domain web server returns a web page that contains an HTTP redirection status message, a META tag, or JavaScript that will cause the browser to navigate to the payment web server (0802). The browser then executes the redirect request to request a web page from the payment web server (0803). The end user completes the payment web form and submits the payment request to the web user (0804). The payment web server processes the payment and sends a payment response code in a new redirection request that directs the browser back to the origin web server (0805). The browser makes the call back redirection request to the origin domain web server with the response code from the payment request (0806).

Deficiencies in the Prior Art

The prior art as detailed above suffers from the following deficiencies:
- Within the context of embedded transaction processing systems, the organization that owns the origin web server is forced to create a PCI compliant environment because payment information is passed across the origin domain web server.
- Within the context of embedded transaction processing systems, the organization that owns the origin web server must pay ongoing costs to maintain PCI compliance including upgrades to equipment, processes, and ongoing audits
- Within the context of embedded transaction processing systems, the organization may need to migrate their content into the payment web server components they install on their server
- Within the context of web redirection transaction processing systems, the organization may have to redirect the user to a website over which they have little or no control over branding the payment experience
- Within the context of web redirection transaction processing systems, the organization must send the user to a third party website to accept payment on behalf of the organization. The number of clients that abandon their transaction as a result of this redirection is close to 30 percent which has a significant cost to the organization performing the redirection.
- Within the context of web redirection transaction processing systems, the customer contact details and payment information is not necessarily always given back to the organization that is accepting payment which sometimes leads to having to have a customer enter the same information twice which leads to customer frustration with their purchasing experience.
- Within the context of web redirection transaction processing systems, the status information from the payment request is dependent on the client submitting the data back to the origin web server. If for any reason this browser communication fails, the information regarding payment status is not received by the origin domain without a separate process and method being implemented to reconcile payments with payment requests.
- Within the context of both embedded transaction processing systems and web redirection transaction processing systems, the prior art does not teach any methodology to avoid the tradeoff between ease-of-implementation and maintenance of an integrated "look-and-feel" GUI experience.

While some of the prior art may teach some solutions to several of these problems, the core issues of reducing the cost of setting up a secure transaction processing environment while enabling a branded payment processing experience have not been addressed.

OBJECTIVES OF THE INVENTION

Accordingly, the objectives of the present invention are (among others) to circumvent the deficiencies in the prior art and affect the following objectives:
(1) Provide for a secure transaction processing system and method that provides the ability to allow payment forms to live within a third party application as a JavaScript client that renders and submits payment directly to the organization processing the payment.
(2) Provide for a secure transaction processing system and method that provides payment processing with minimal impact to the existing web application and no requirement for Payment Card Industry (PCI) security compliance as a result of accepting payments to their organization.
(3) Provide for a secure transaction processing system and method that permits an origin web page to use their own branding without the need to redirect the customer to a third party website.
(4) Provide for a secure transaction processing system and method that reduces dropped transactions caused by loss of web page "look and feel" context.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The disclosed secure transaction processing system and method provides a mechanism to inject and submit payment forms into a web page via a JavaScript client application utilizing Cross Domain requests (CORS, WebSockets, JSONP, etc.). The browser based JavaScript client application detects and manages style and behavior conflicts with the payment form to render the payment forms within a web page. The JavaScript web browser application then submits the forms via a selected Cross Domain Request communication method to the web server which processes the transaction and instructs the web browser application where to next navigate within origin domain website.

The present invention in several preferred embodiments utilizes a set of JavaScript libraries that communicate with a web server application and can be integrated with a third party's website. These libraries permit rendering of payment forms within the customer's desired web pages and require only basic web design skills for integration into the origin domain web page. One objective goal in this architecture is to lower the overall barrier to including payment capabilities within an existing website.

This client library manages direct communication of payment related information (and payment results) via HTTP/HTTPS which eliminates the need to install and maintain payment processing on a customer's web server and eliminates the need to redirect the client to an outside website to complete payment processing.

The client library also manages conflicts with existing JavaScript libraries, browser versions, client styles applied to the current page, etc. in order to be able to render the forms in a current web page. The style sheets and JavaScript API provided within this context to the customer provide the capability to style and brand the payment forms as that of the origin domain web page owner, making the experience for the third party's customer a seamless branded experience.

BRIEF DESCRIPTION OF THE DRAWINGS

For a fuller understanding of the advantages provided by the invention, reference should be made to the following detailed description together with the accompanying drawings wherein:

FIG. 22 illustrates the process of submitting a payment request for processing by a payment processing vendor;

FIG. 23 illustrates a typical HTML script inserted into the Origin Domain Website to affect secure transaction processing using one preferred embodiment of the present invention;

DESCRIPTION OF THE PRESENTLY PREFERRED EXEMPLARY EMBODIMENTS

Figure 1:
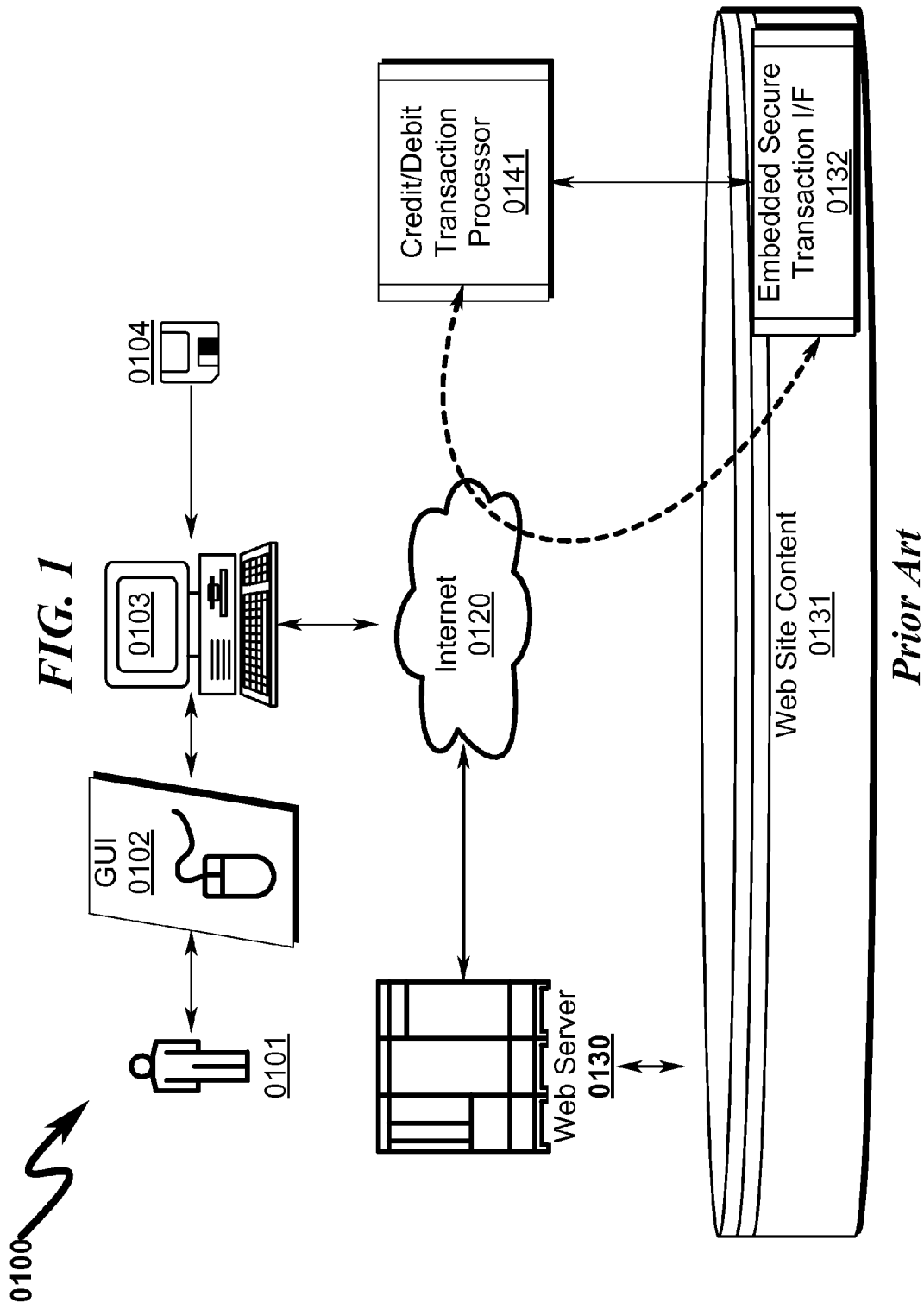
FIG. 1 illustrates a exemplary system embodiment of the prior art.
Figure 2:
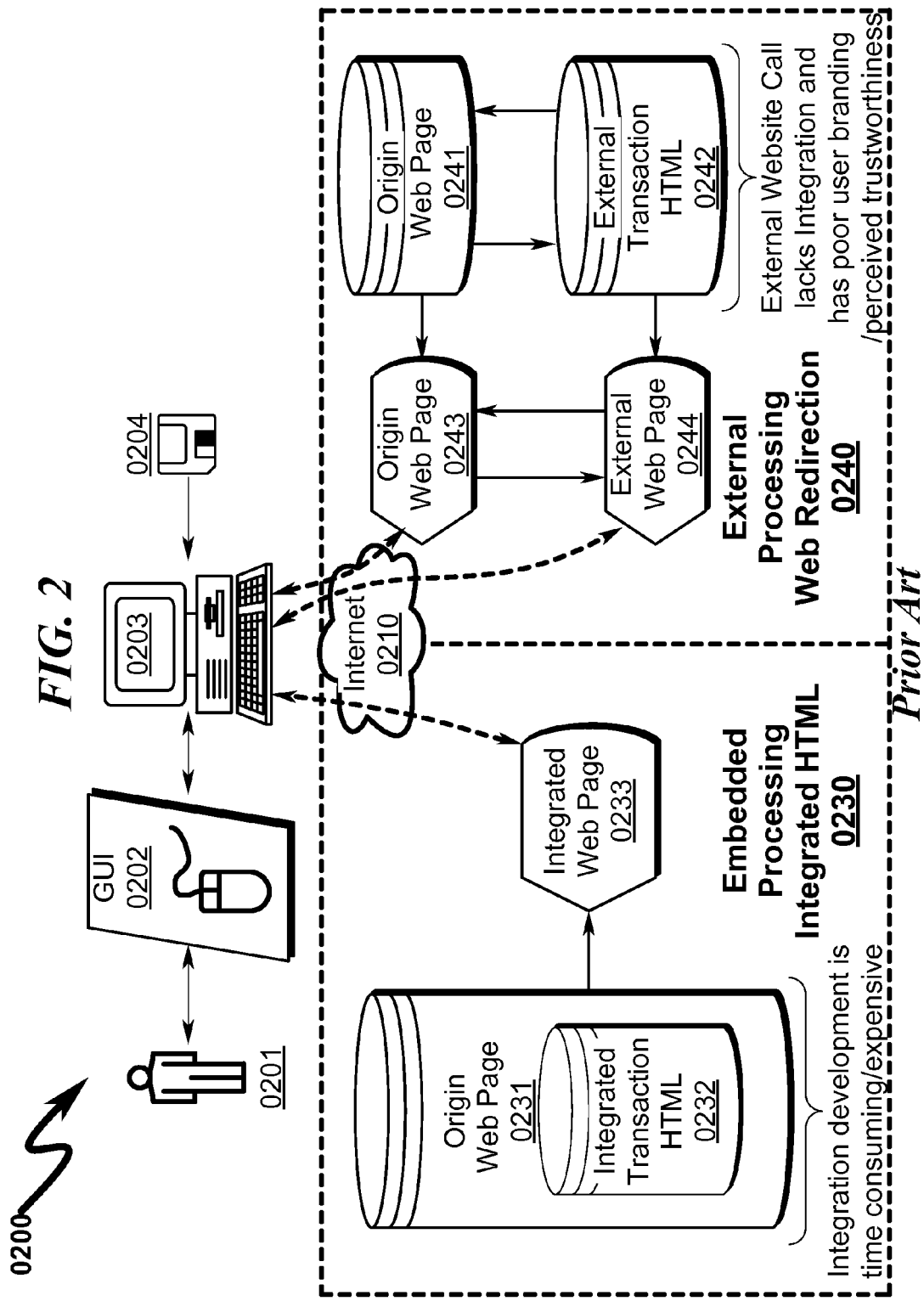
FIG. 2 illustrates two implementations of secure transaction processing (embedded and web redirected) as taught by the prior art.
Figure 3:
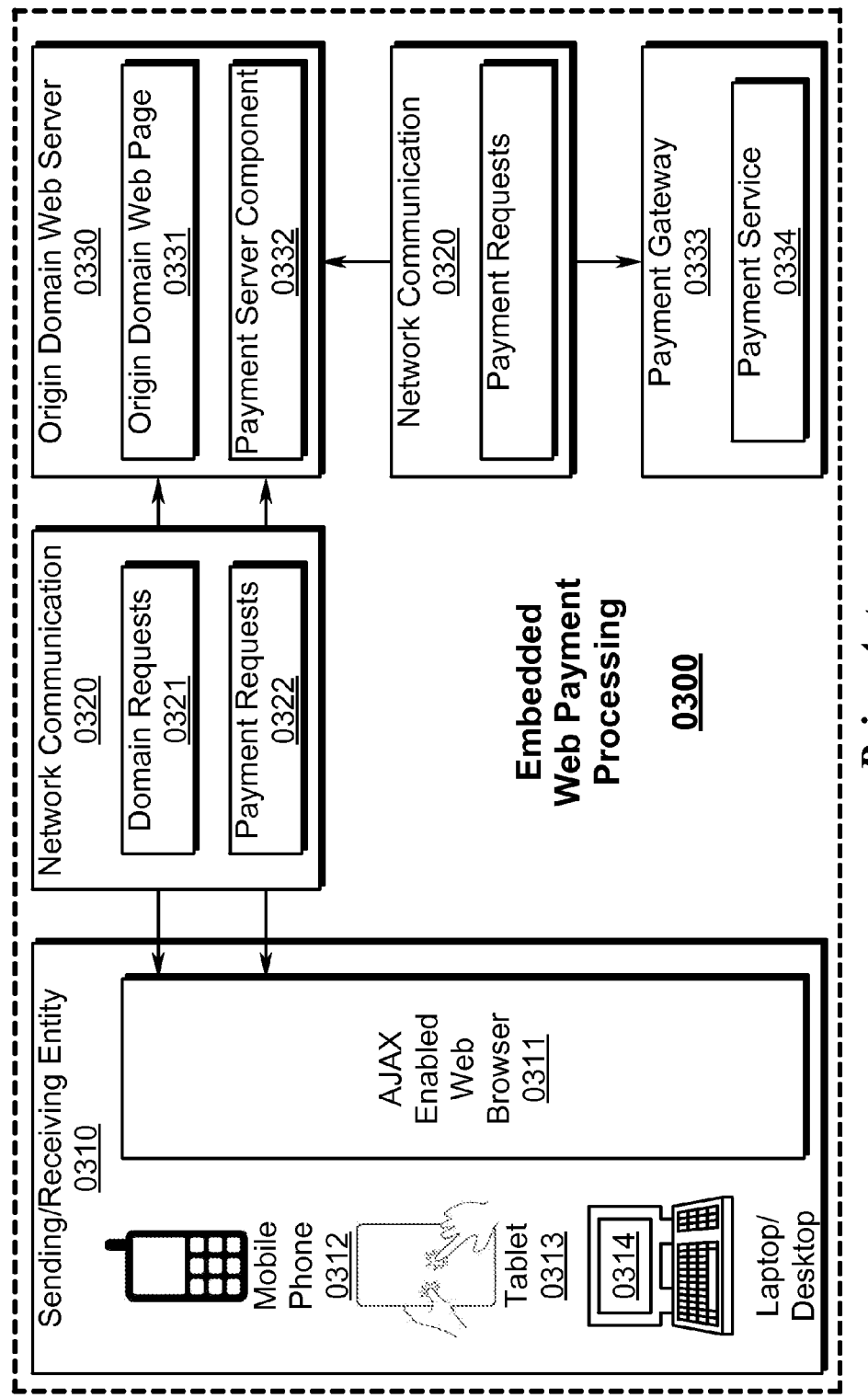
FIG. 3 illustrates an exemplary block diagram of prior art for performing embedded payment processing requests.
Figure 4:
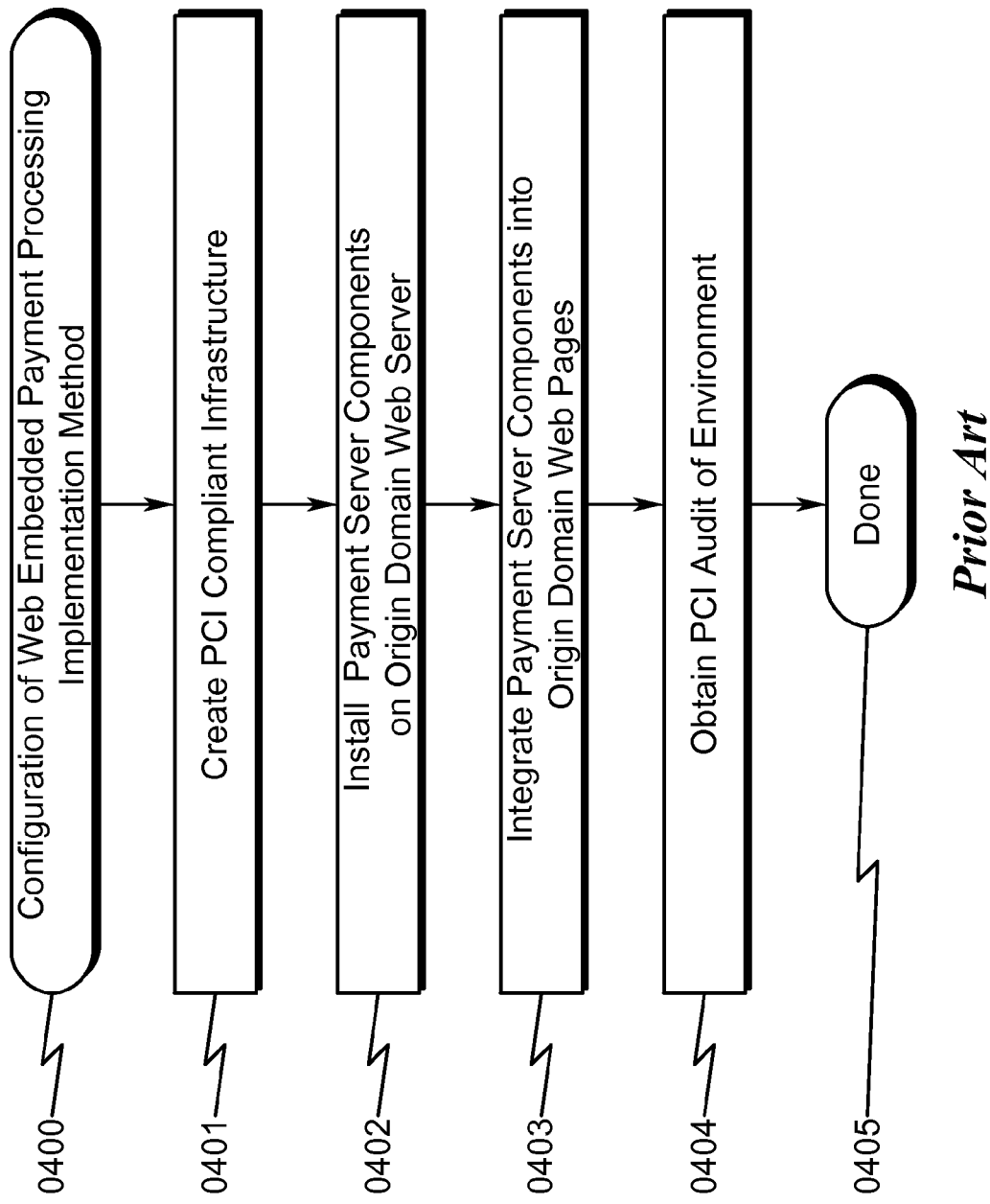
FIG. 4 illustrates an exemplary prior art method for configuring an embedded payment processing system.
Figure 5:
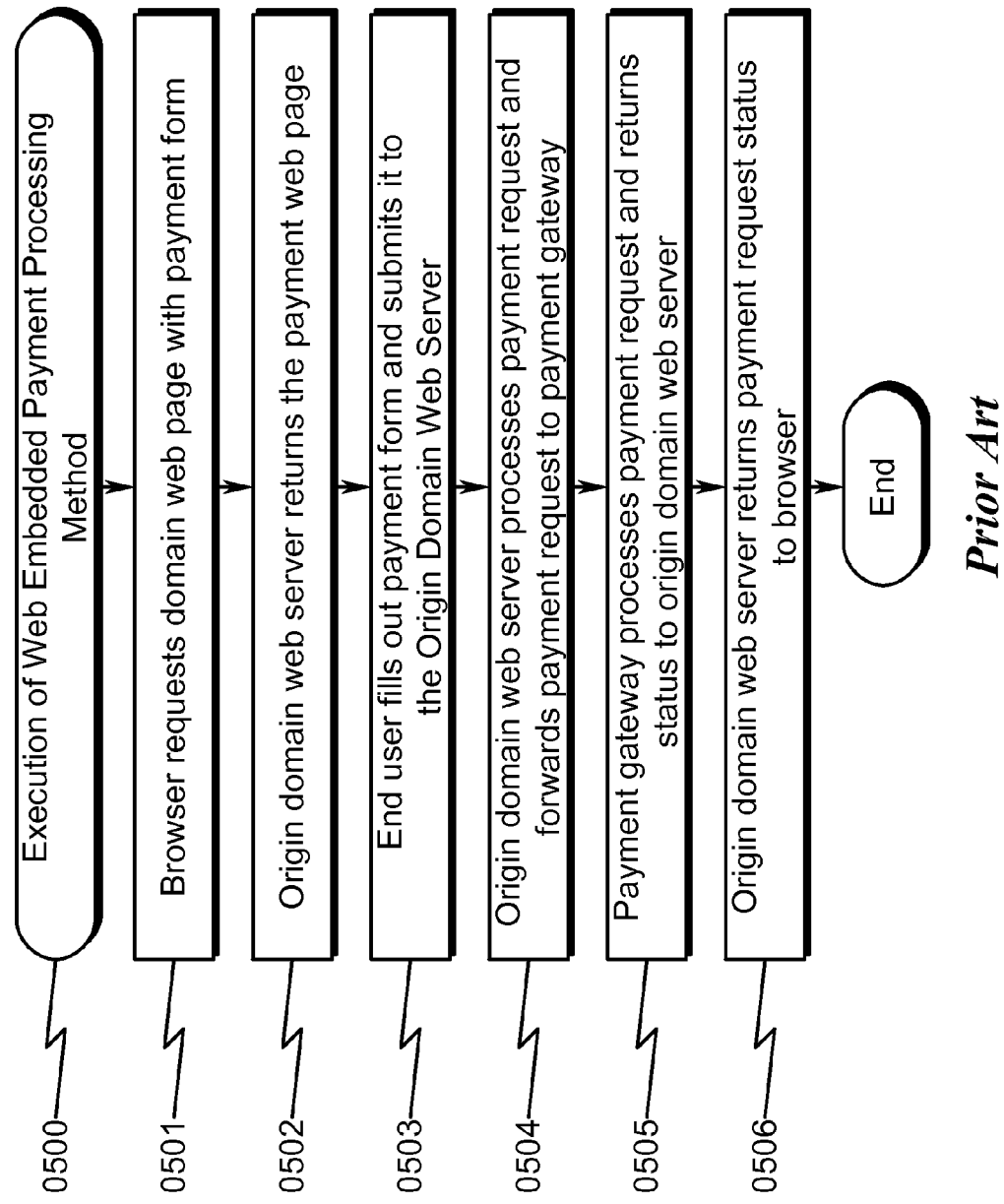
FIG. 5 illustrates an exemplary prior art method of executing an embedded payment request.
Figure 6:
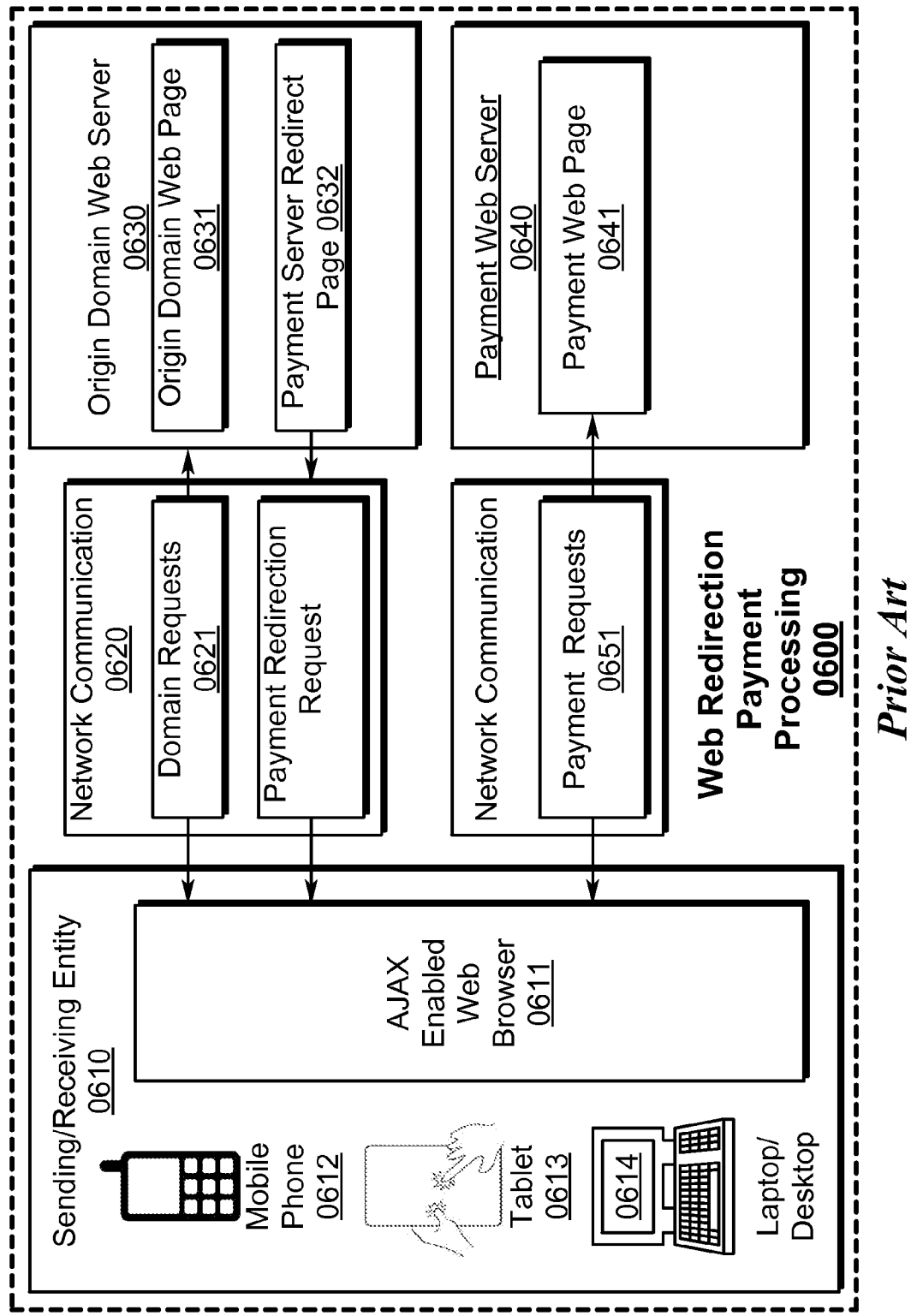
FIG. 6 illustrates an exemplary prior art block diagram for performing redirected payment processing requests.
Figure 7:
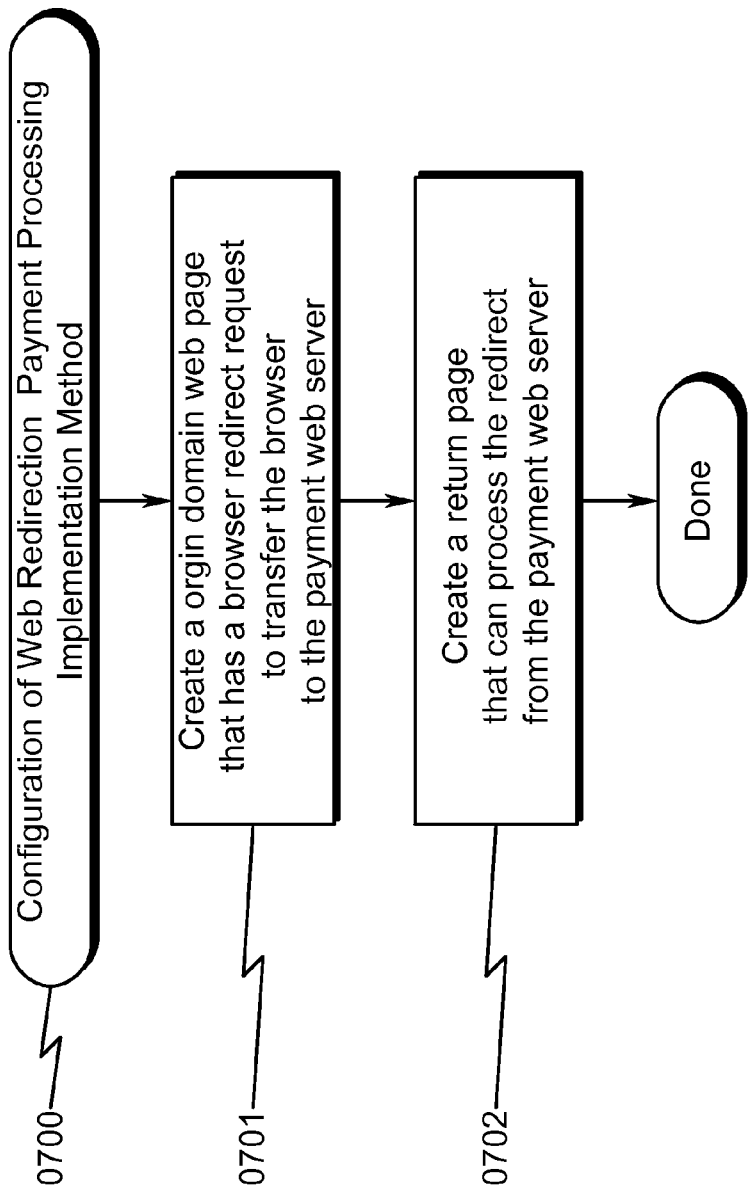
FIG. 7 illustrates an exemplary prior art method of configuring redirected payment processing requests.
Figure 8:
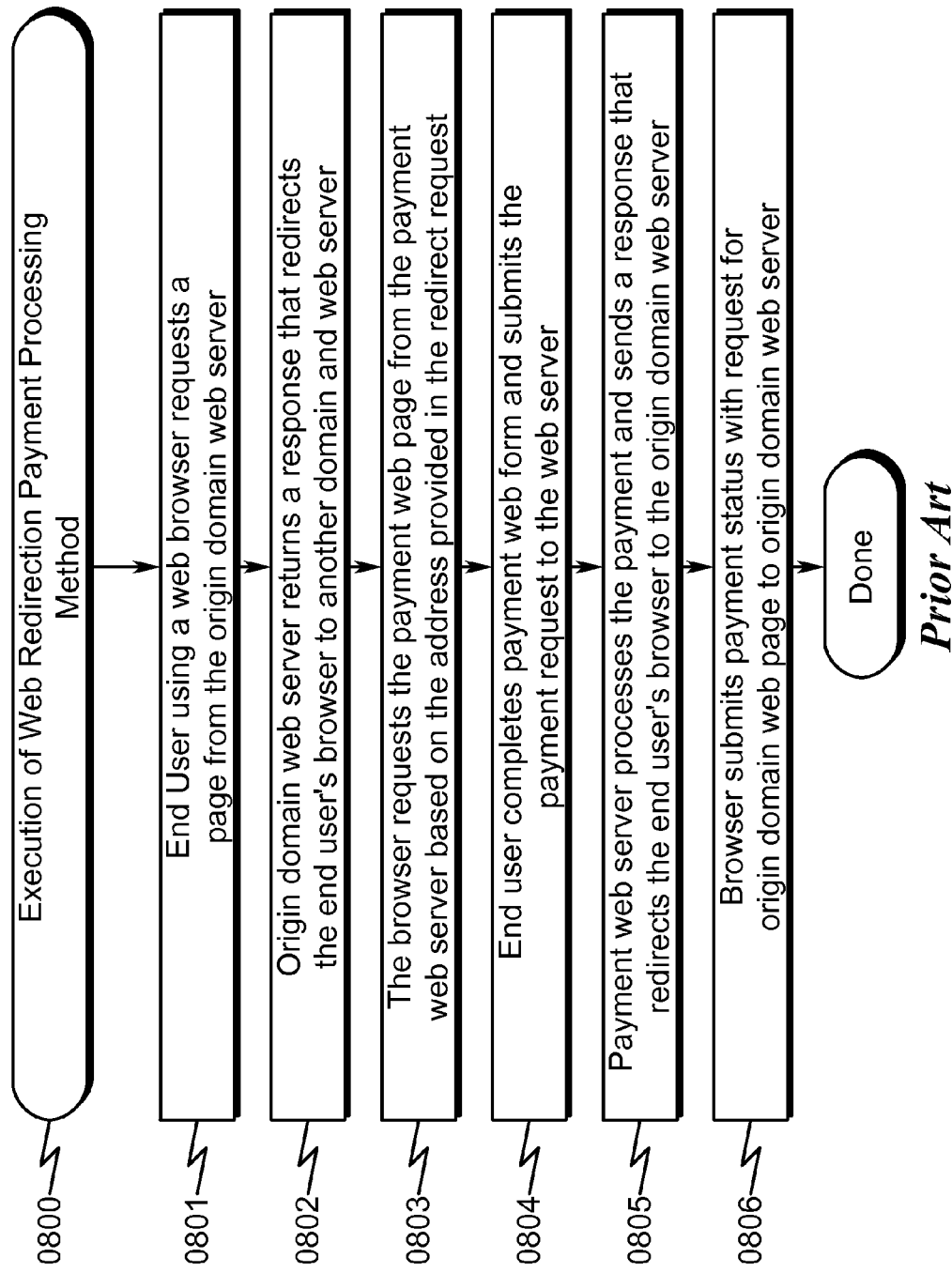
FIG. 8 illustrates an exemplary prior art method of executing a redirected payment processing request.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a SECURE TRANSACTION PROCESSING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Cross Domain Communication not Limitive

The present invention anticipates that a wide range of cross domain communication methodologies may be utilized to affect a specific implementation of the present invention. While the present invention specifically anticipates that the use of CORS, WebSockets, and JSONP are considered optimal for most applications, the present invention makes no limitation on the type of cross domain communication technology that may be used.

JavaScript not Limitive

The present invention anticipates that a wide range of software languages may be utilized to implement various embodiments of the present invention. While one preferred language dialect is JavaScript, the present invention is not limited to this particular programming language, and one skilled in the art will recognize that other languages may be utilized to implement the functionality described herein.

Cross Domain Requests

While the present invention may be implemented in a wide variety of configurations, many preferred embodiments utilize one or more cross-domain communication methodologies to implement a secure transaction processing system/method as described herein. Within this context, the limitations of cross-domain communication as dictated by current web browser technologies represents a hurdle that must be overcome in order to provide the desired secure transaction processing functionality.

Due to concerns related to privacy and information security, cross domain requests are not available in most web browser versions without the use of specialized communication mechanisms. A cross domain request is any request initiated by JavaScript from within a web page. A browser running JavaScript cannot post data or request information from a web server other than the domain of the web page. So if the origin domain of a web page is for example <www.myorganization.com> the JavaScript on the page <www.myorganization.com/index.html> can only request and send information to <www.myorganization.com> unless a specialized communication mechanism is used. The specialized communication mechanisms available are generally JSONP, CORS, and WebSockets. These communication mechanisms provide a vehicle for communicating with another domain <www.paymentserver.com>. In some cases IFrames have been used to accomplish the same goal, but the use of IFrames prevents clients from being able to directly style the cross domain content in the same manner as they would the content surrounding the IFrame.

General Invention Implementation Support Primitives

For purposes of understanding some of the terms used in the exemplary invention embodiment diagrams and in the system and method narratives disclosed herein the following sections are provided to describe general support primitive structures that may be used in some preferred embodiments of the present invention:
  Web Redirection
  PCI Compliance
  JSON
  JSONP
  CORS
  WebSockets Web Redirection
  Web redirection typically involve the use of a specific HTTP response code, client side JavaScript, or meta tags to indicate to the browser that it should use a different URI for the address it is requesting.

PCI Compliance
  The Payment Card Industry (PCI) is an association which has defined a set of standards and procedures for implementing and maintain a secure infrastructure to protect payment information. More information regarding these standards and procedures can be found at https://www.pcisecuritystandards.org/.

JSON
  JSON syntax is built on two structures: a collection of name/value pairs and an ordered list of values. The collection of name/value pairs goes by different nomenclature depending on the language involved, and this structure is typically realized as an OBJECT, a RECORD, a STRUCT, a HASH TABLE, a KEYED LIST, or an ASSOCIATIVE ARRAY. For discussion purposes the OBJECT nomenclature will be used herein and is given by example below:

```
{ "PaymentForm" : {
  "Application Key" : "12345",
  "Billing Form" : {
        "First Name Field" : {
        "Label": "First Name",
        "Input": "Text Box",
        "Validation" : "Required"}
        }
    }
}
```

JSONP
  JSONP is based on the embedding a JSON object and "padding" it with a FUNCTIONCALL wrapper. The result is a JSON object which is delivered as a function call. So the response generally looks as given in the following example with the JSON object returned as an argument to a function call:

```
functionPaymentForm(
    { "PaymentForm" : {
    "Application Key" : "12345",
    "Billing Form" : {
            "First Name Field" : {
            "Label": "First Name",
            "Input": "Text Box",
            "Validation" : "Required"}
            }
        }
    })
```

CORS

CORS is based on a specification for Cross-Origin Resource Sharing which is working on a mechanism to provide a more secure and simpler mechanism than JSONP for cross domain resource requests. The standard provides the ability for an origin web server to specifically grant or deny JavaScript the ability to request and cross domain resources without having to use the JSONP mechanism. More information on this topic can be found at http://www.w3.org/TR/cors/.

WebSockets Background

WebSockets is based on a specification for enabling two-way communication between a client such as a web browser and a remote host. More information on this topic can be found at http://dev.w3.org/html5/websockets/.

Cross Domain Payment Processing System (0900)

Figure 9:
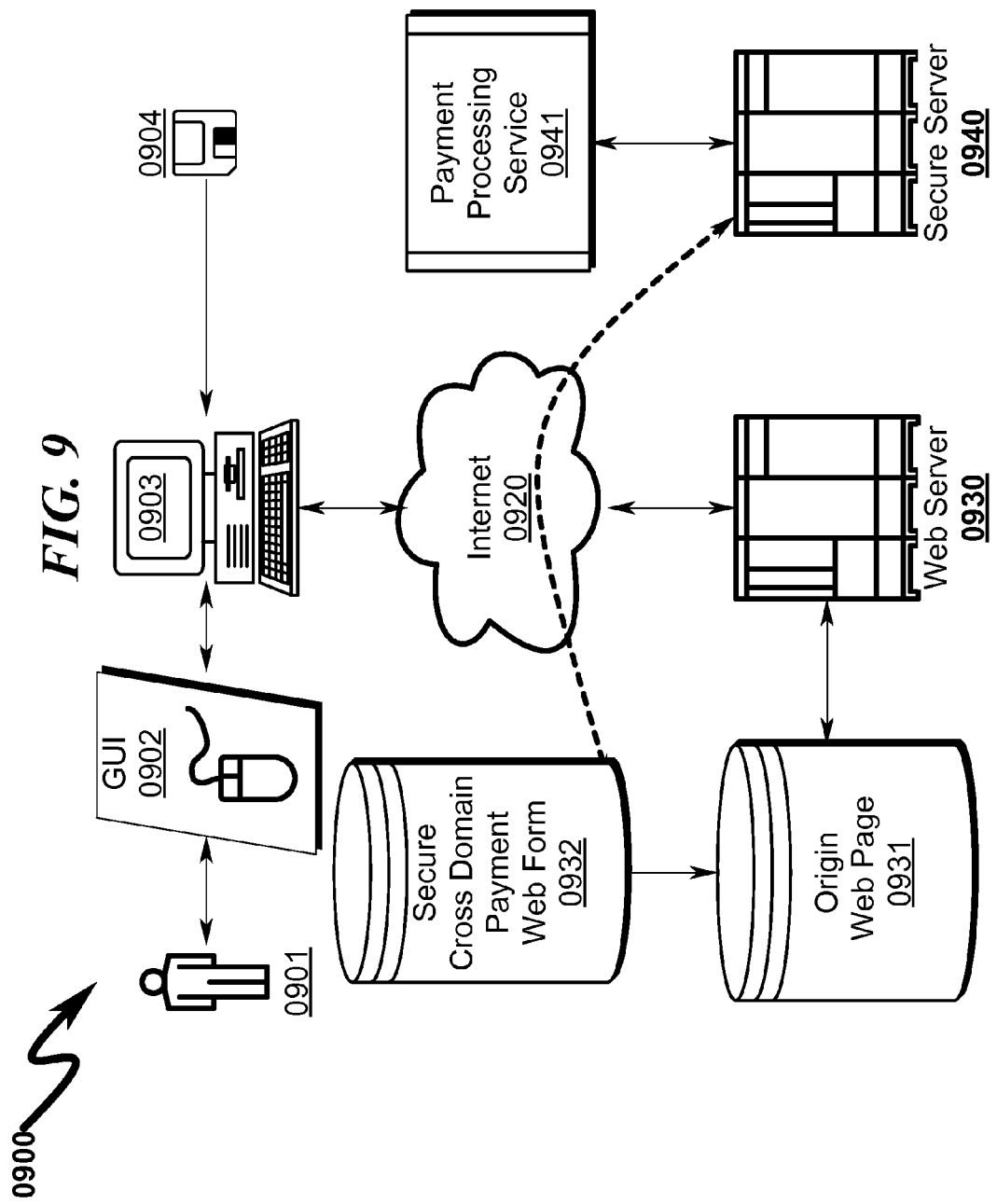
FIG. 9 illustrates a preferred exemplary system implementation of the present invention.

Within the present invention system context, an exemplary embodiment of the Cross Domain Payment Processing system is generally illustrated in FIG. 9 (0900) wherein an end user (0901) interacts with a Graphical User Interface (GUI) (0902) to interact with a computer (0903) using software read from a computer readable medium (0904) to access the Internet (0920). An origin web page (0931) is requested from a web server (0930) which contains the secure cross domain processing HTML (0932) and is displayed using a Graphical User Interface (GUI) (0902). The secure cross domain processing HTML contains a cross domain JavaScript application reference to the secure payment server (0940). The JavaScript application provided by the secure cross domain payment server (0940) interacts with the payment processing service (0941) to handle payment requests.

A significant advantage to this approach revolves around both ease-of-implementation and maintenance of web page "look and feel". The secure cross domain payment HTML (0932) is simply several code lines that are "dropped into" the origin domain web page (0931) to provide the necessary secure transaction processing functionality. Once this insertion is complete, the secure server (0940) and associated software components ensures that the "look and feel" of the origin domain web page (0931) is maintained during the secure transaction processing functions associated with the payment processing service (0941).

Exemplary Invention System Integration (1000)

Figure 10:
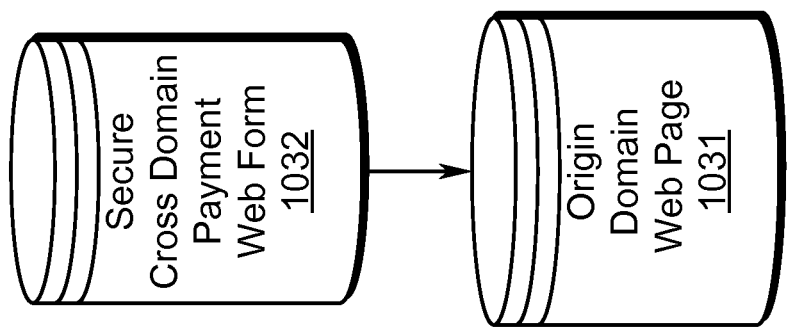
FIG. 10 illustrates a preferred exemplary system embodiment overview of the invention.

With reference to FIG. 10 (1000), the present invention may in some preferred embodiments integrate the secure transaction processing functionality via the insertion of a minimal code fragment (1032) within the origin domain web page (1031). While many types of code insertion are anticipated, a typical example of this is illustrated in FIG. 23 (2500). This trivial code modification to the origin domain web page (1031) permits rapid deployment of a secure transaction processing function using the teachings of the present invention.

Exemplary Invention System Overview (1100)

Figure 11:
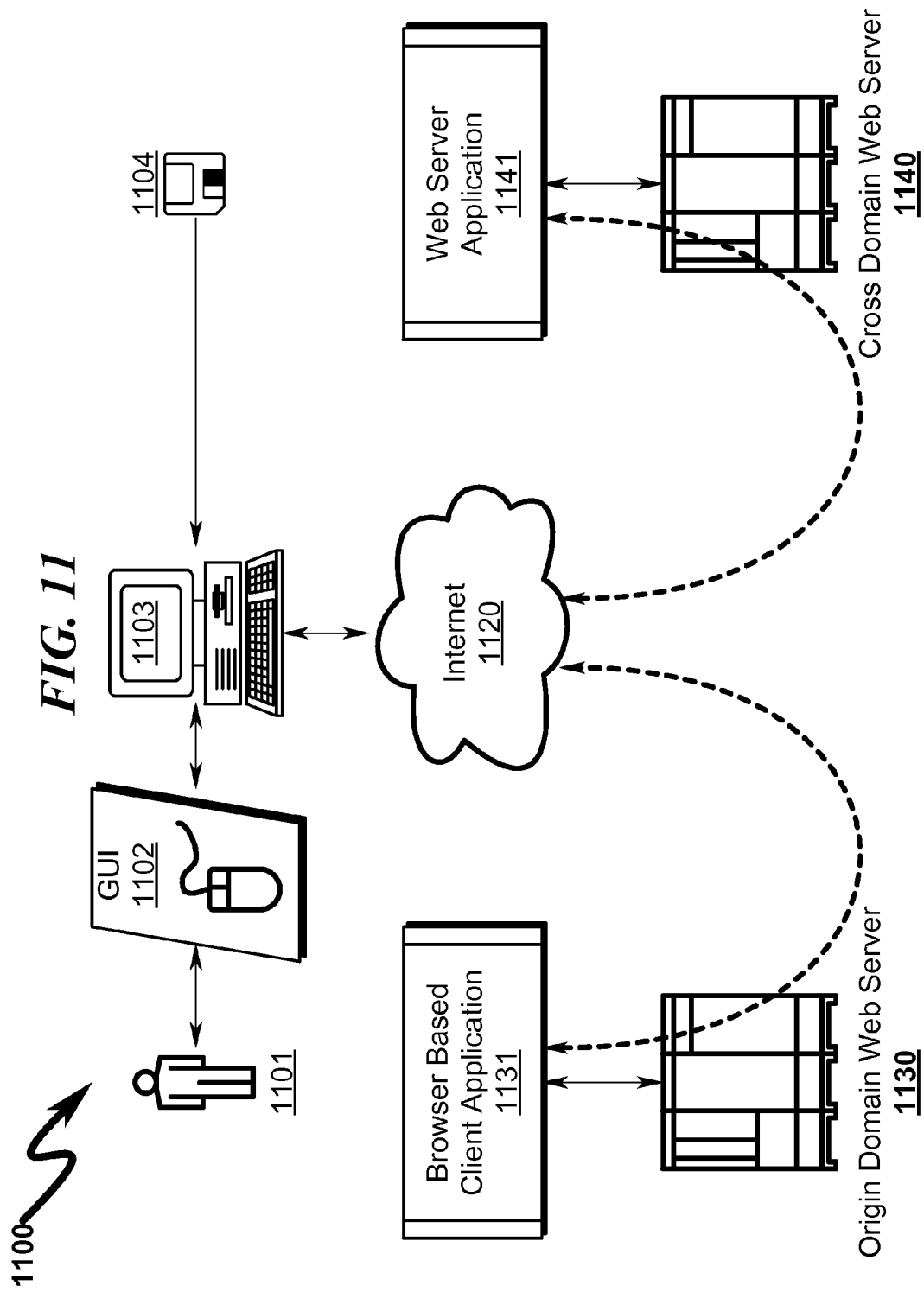
FIG. 11 illustrates a preferred exemplary method embodiment overview of the invention.

A system overview of a preferred embodiment of the present invention is generally illustrated in FIG. 11 (1100). Within this context, the user/consumer (1101) interacts with a GUI (1102) under direction of a computer system (1103) running under control of software read from a computer readable medium (1104). This hardware/software complement communicates over a network (Internet) (1120) to a origin domain web server (1130) hosting a browser based client application (1131) that then communicates with a cross domain web server (1140) hosting a web server application (1141). The communication between the browser based client application (1131) and the cross-domain web server application (1141) pushes the processing of secure transactions away from the origin domain web server (1130) and onto a remote secure server (1140) with the caveat that the user interface presented to the user (1101) via the GUI (1102) is maintained within the visual context of the browser based client application (1131).

Thus, the system overview as shown permits the "look and feel" of the browser based client application (1131) to be maintained while simultaneously transferring the majority of the detail work associated with secure transaction processing onto the remote cross-domain web server (1140). This results in a significant reduction in development and maintenance costs to the browser based client application while maintaining a consistent "look and feel" during the payment transaction processing interaction with the user (1101) via the GUI (1102). Note that while this configuration does not explicitly indicate a payment processing subsystem, hardware and/or software to accomplish this function can be incorporated into separate system components (not shown) or integrated into existing hardware indicated in this diagram.

Exemplary Invention Method Overview (1200)

Figure 12:
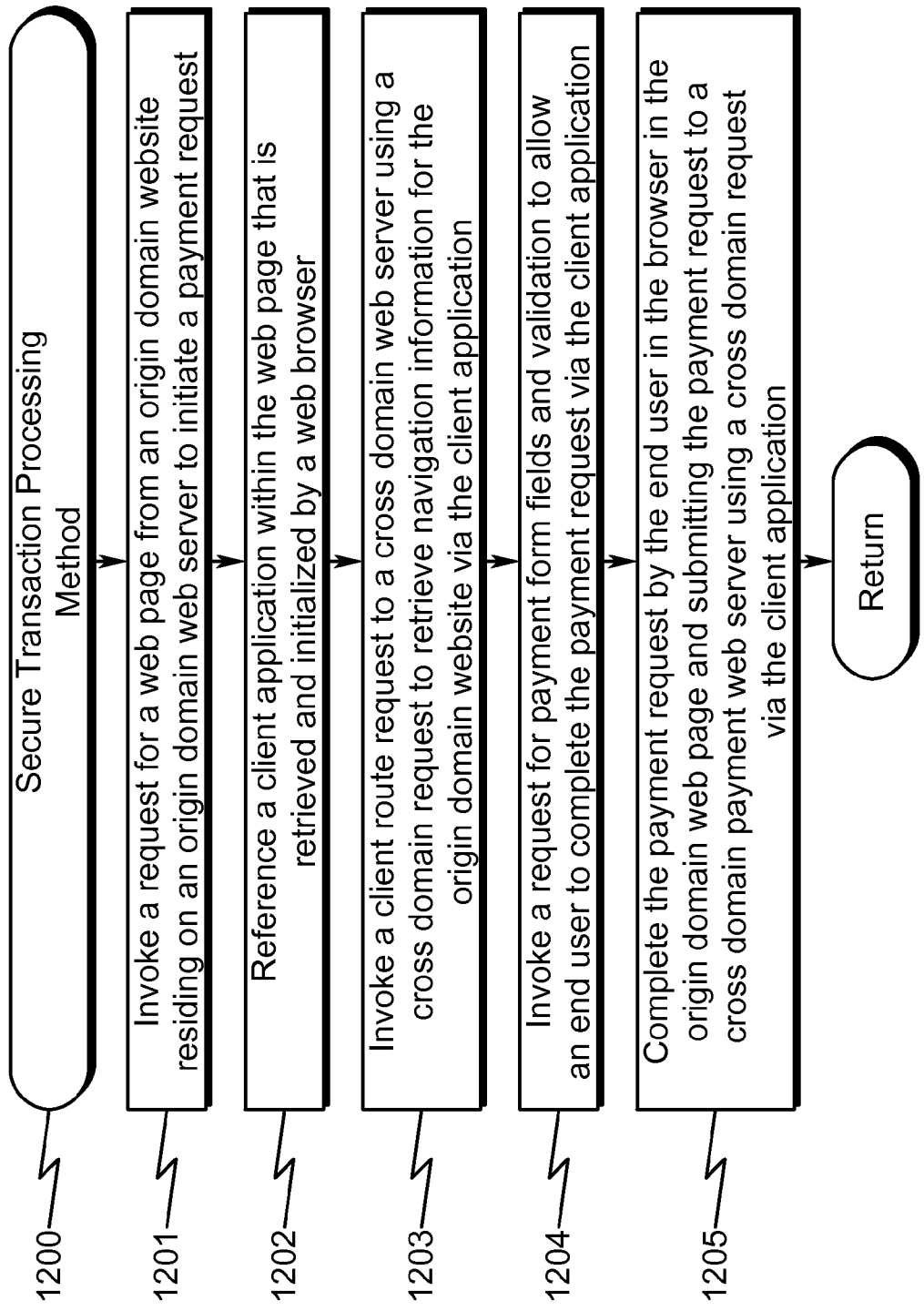
FIG. 12 illustrates a preferred exemplary system embodiment of the invention.

An overview of a preferred method embodiment of the present invention is generally illustrated in the flowchart of FIG. 12 (1200) and can be generalized as a secure transaction processing method comprising:

(1) Invoking a request for a web page from an origin domain website residing on an origin domain web server to initiate a payment request (1201);
(2) referencing a client application within the web page that is retrieved and initialized by a web browser (1202);
(3) invoking a client route request to a cross domain web server using a cross domain request to retrieve navigation information for the origin domain website via the client application (1203);
(4) invoking request for payment form fields and validation to allow an end user to complete the payment request via the client application (1204); and
(5) completing the payment request by the end user in the browser in the origin domain web page and submitting the payment request to a cross domain payment web server using a cross domain request via the client application (1205).

This general method may be modified heavily depending on a number of factors, with rearrangement and/or addition/ deletion of steps anticipated by the scope of the present invention. Integration of this and other preferred exemplary embodiment methods in conjunction with a variety of preferred exemplary embodiment systems described herein is anticipated by the overall scope of the present invention.

Cross Domain Payment Processing Submodules (1300)

Figure 13:
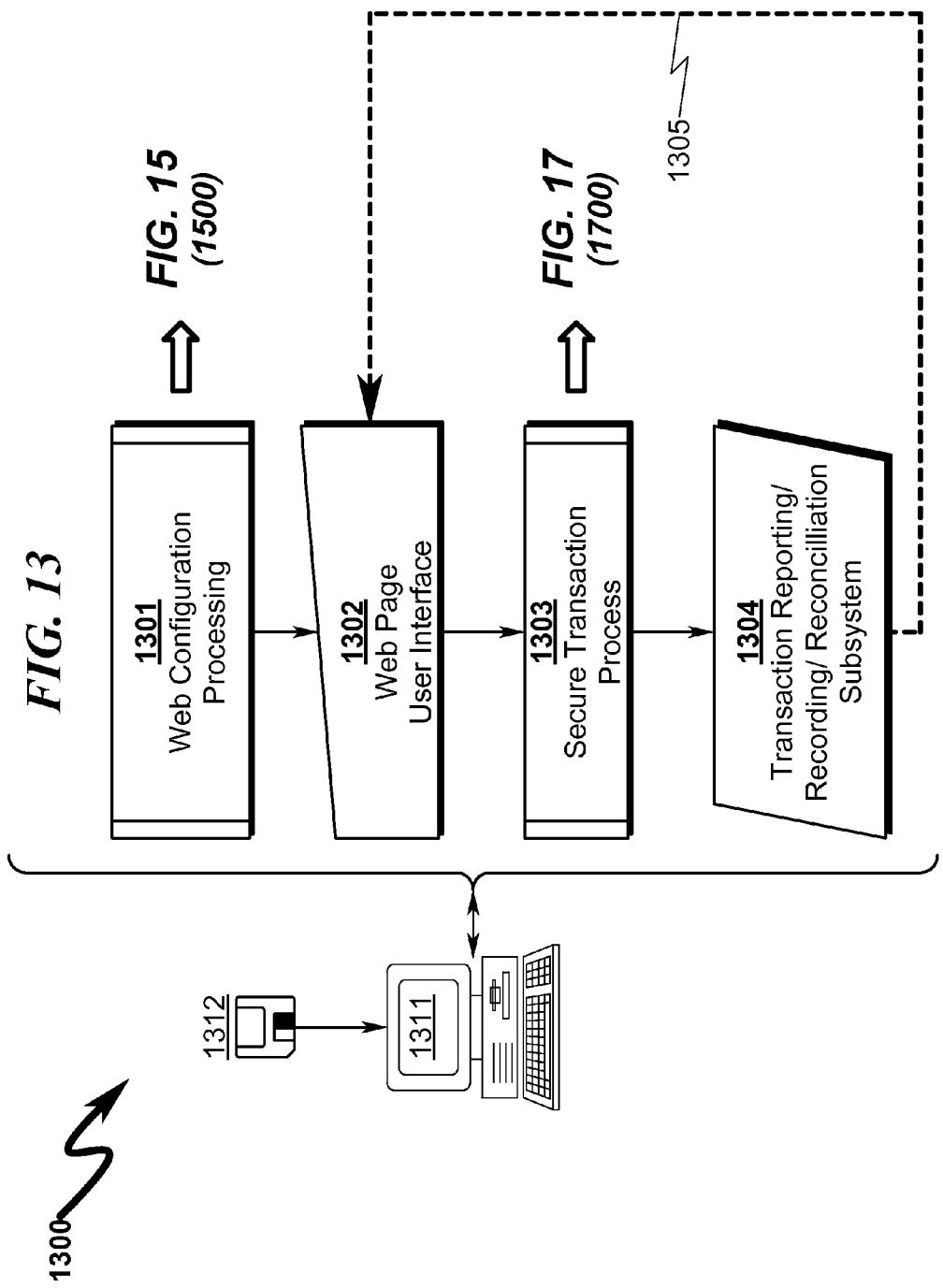
FIG. 13 illustrates the logical subsystems in the embodiment of the invention.

Within the present invention system context, an exemplary embodiment of a Cross Domain Payment Processing system is generally illustrated in FIG. 13 (1300) wherein the four major components that support this embodiment comprise the following:
- A web configuration process which is used to setup an organization's web page for payment processing (1301).
- The web page user interface provided by the origin domain to the end user (1302).
- The secure cross domain payment request process (1303) provides the mechanism for end users to make a payment request.
- The transaction reporting/recording/reconciliation subsystem (1304) provides a mechanism to record the financial transaction and provide information to the origin domain and the end user regarding their payment transaction.

All of these system components operate within the context of one or more computer systems (1311) controlled by software read from a computer readable medium (1312). As indicated by this system diagram, once the initial web configuration processing (1301) is complete, the remaining secure transaction processing system components (1302, 1303, 1304) may operate in a feedback configuration (1305) without the need for additional software installation/maintenance overhead.

Cross Domain Payment Processing Block Diagram (1400)

Figure 14:
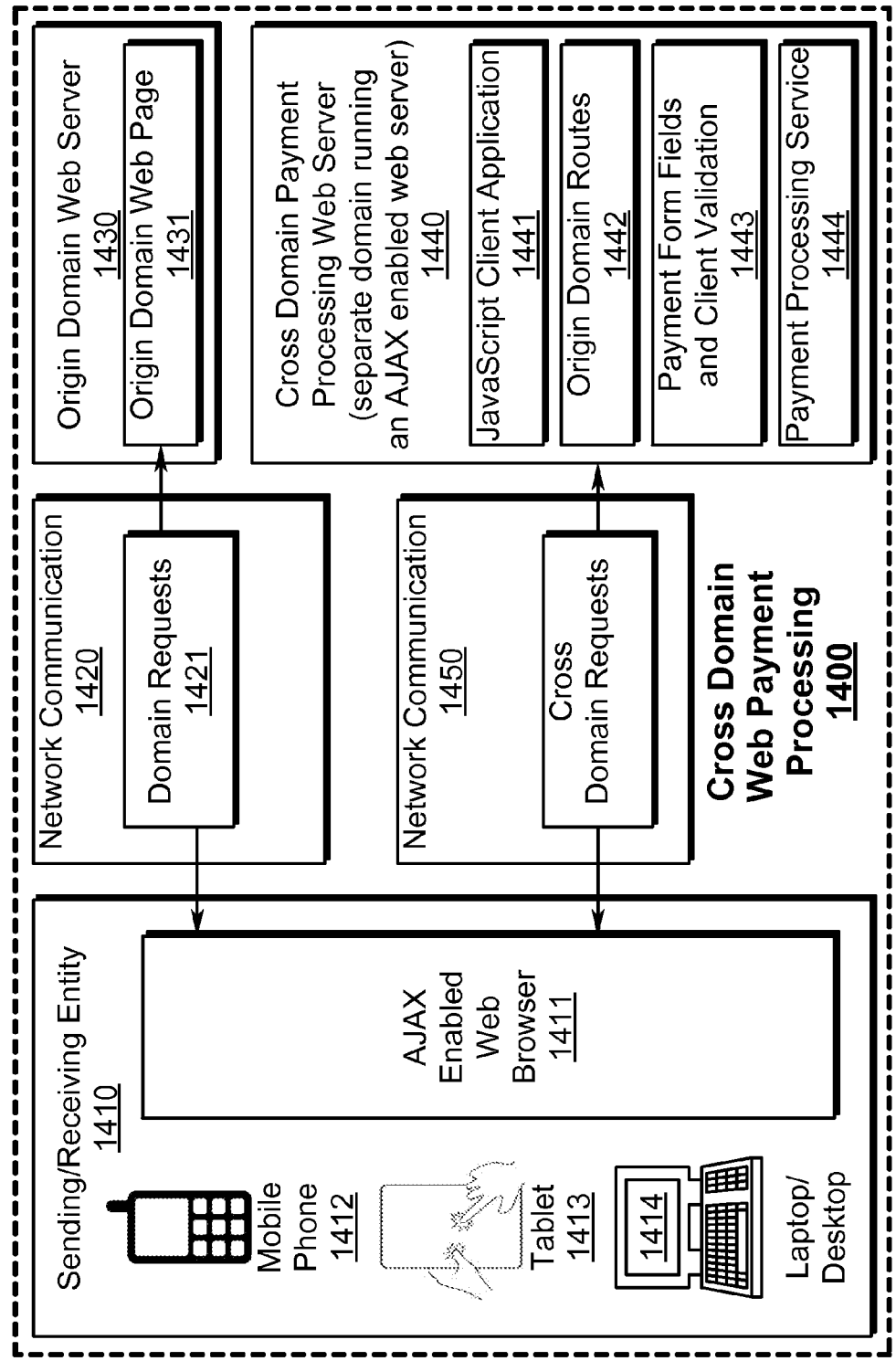
FIG. 14 illustrates a block diagram describing the system.

Within the present invention system context, an exemplary embodiment of the Cross Domain Payment Processing System is generally illustrated in FIG. 14 (1400) wherein the cross domain payment request processing system involves a sending/receiving entity (1410) that can be any device that has an AJAX capable web browser (1411) such as a mobile phone (1412), a tablet (1413), a laptop or desktop (1414). A sending/receiving entity (1410) makes domain web page requests (1421) using an AJAX enabled browser (1411) through a network connection (1420) to view a web page (1431) that is hosted on an organization web server (1430). When the sending receiving entity (1410) requests a web page that is for payment, the origin domain web server returns an origin domain web page with a JavaScript reference to the JavaScript application (1441) on the cross domain payment server (1440). The web browser (1411) will load and run the JavaScript application (1441) as the web page is loaded. The JavaScript application communicates via the network connection (1450) to retrieve origin domain routes (1442), payment form fields and validation (1443), and to submit payment requests (1444) via cross domain requests to the cross domain payment web server (1440).

Cross Domain Payment Processing Implementation (1500)

Figure 15:
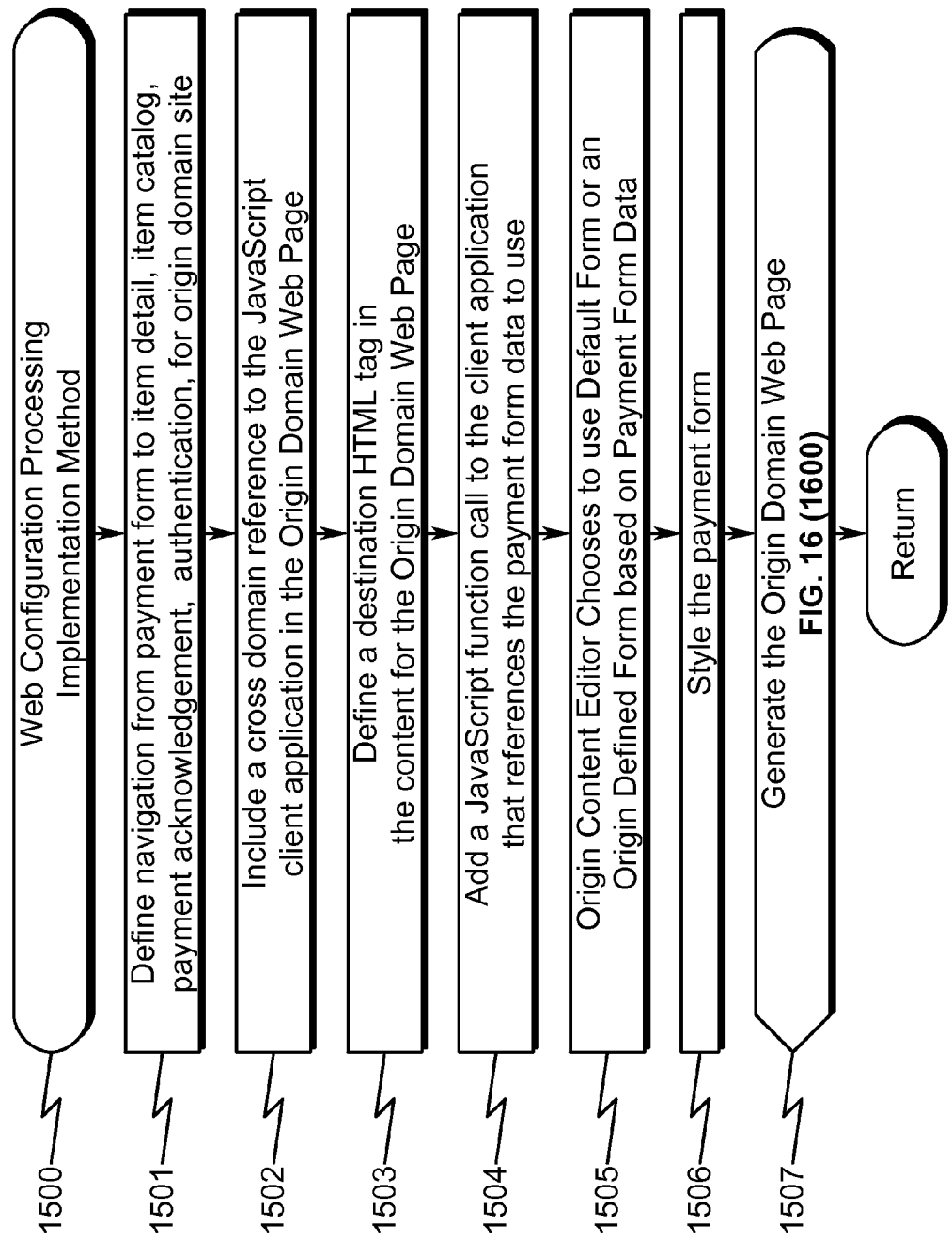
FIG. 15 illustrates an exemplary process of configuring a domain web page to use a cross domain payment request.

In order to ensure that the JavaScript application has enough logic to render standard payment forms it must be aware of how to facilitate navigation within the origin/payment web page (including but not limited to the item detail being paid for, item search, how to authenticate on the organization's website to ensure an appropriate customer experience for payment form navigation that is not customized, etc.) Within the present invention system context, an exemplary embodiment of the Cross Domain Payment Processing implementation configuration method is generally illustrated in FIG. 15 (1500) wherein the origin web content designer registers significant navigation routes with the cross domain secure payment server so that when default payment forms are rendered they are rendered with appropriate navigation (1501). The web content designer includes a reference to the JavaScript client application (1502). An injection point on the origin domain web page is specified by naming an HTML element which will be the container for the injected payment form (1503). A single line of JavaScript which invokes the payment form injection function in the JavaScript client application reference added in (1502) with a reference to the element created in (1503) is added to the web page to invoke the cross domain request for payment fields and validation (1504). At this point the web designer can choose to use the payment form template that is capable of being styled from the cross domain payment web server or to build their own payment form based on the data requirements for cross domain payment requests (1505). The origin web page is then styled using the theme, fonts, images, etc. that are in line with the origin web page's design (1506). The result of these steps is the generation of the Origin Domain Web Page with payment processing as generally illustrated in FIG. 16 (1600).

Cross Domain Payment Processing Configuration Output (1600)

Figure 16:
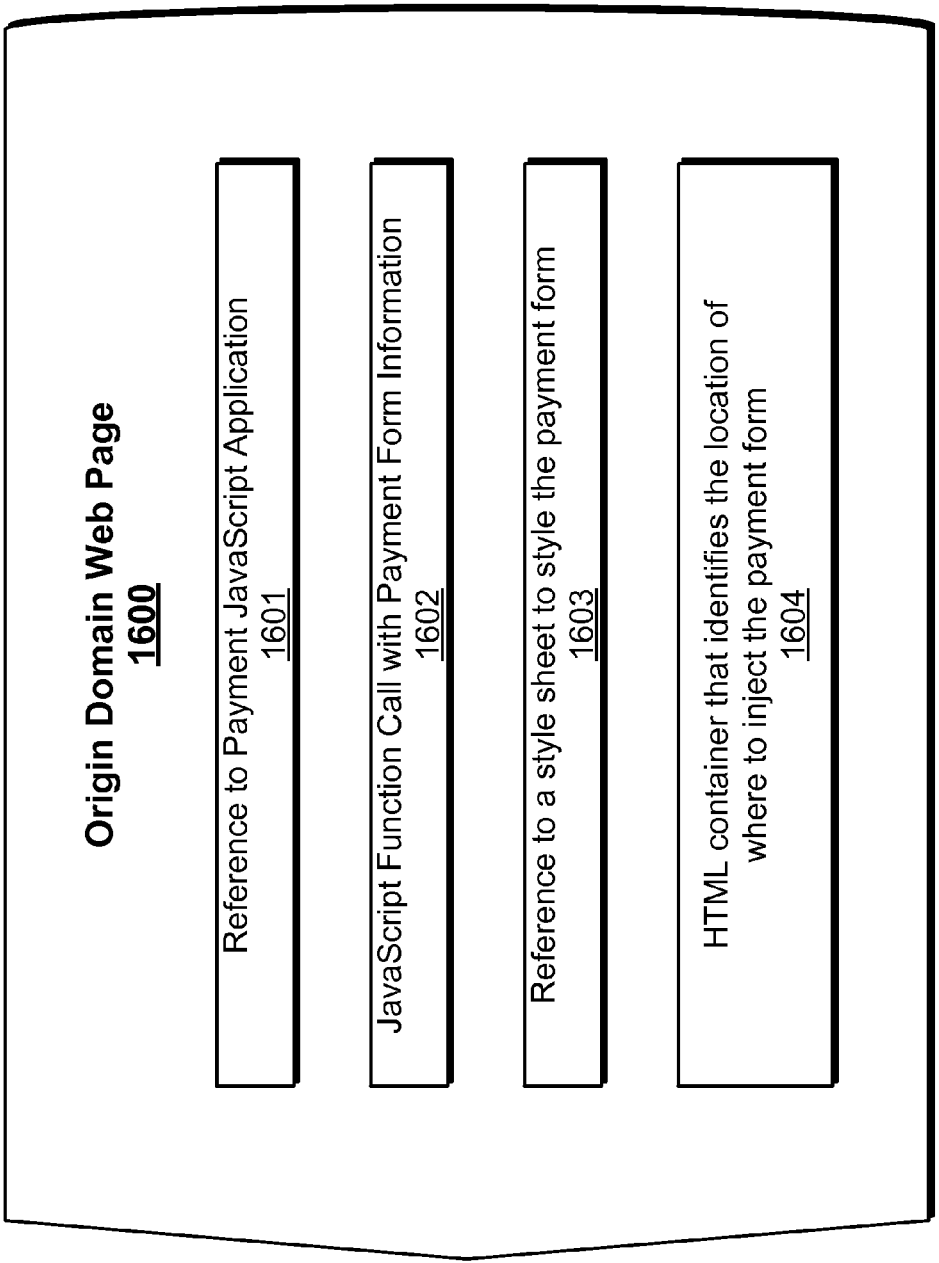
FIG. 16 illustrates an exemplary output of the configuration process described in FIG. 11.

Within the present invention system context, an exemplary embodiment of the Cross Domain Payment Processing Output is generally illustrated in FIG. 16 (1600) wherein the result of the cross domain payment processing configuration is a web page that generally comprises the following four elements
- A reference to the cross domain JavaScript client application (1601);
- A JavaScript function call which invokes payment form field injection and creates validation events prior to submission (1602);
- A reference to a style sheet or styling that renders the payment form in a manner that matches the style and brand of the website that it is supporting (1603); and
- A HTML container with an ID attribute that identifies where the payment form should be rendered on the web page (1604).

One skilled in the art will recognize that this list is non-exhaustive and maybe amended or modified to meet particular application context requirements as necessary.

Cross Domain Payment Processing Method Overview (1700)

Figure 17:
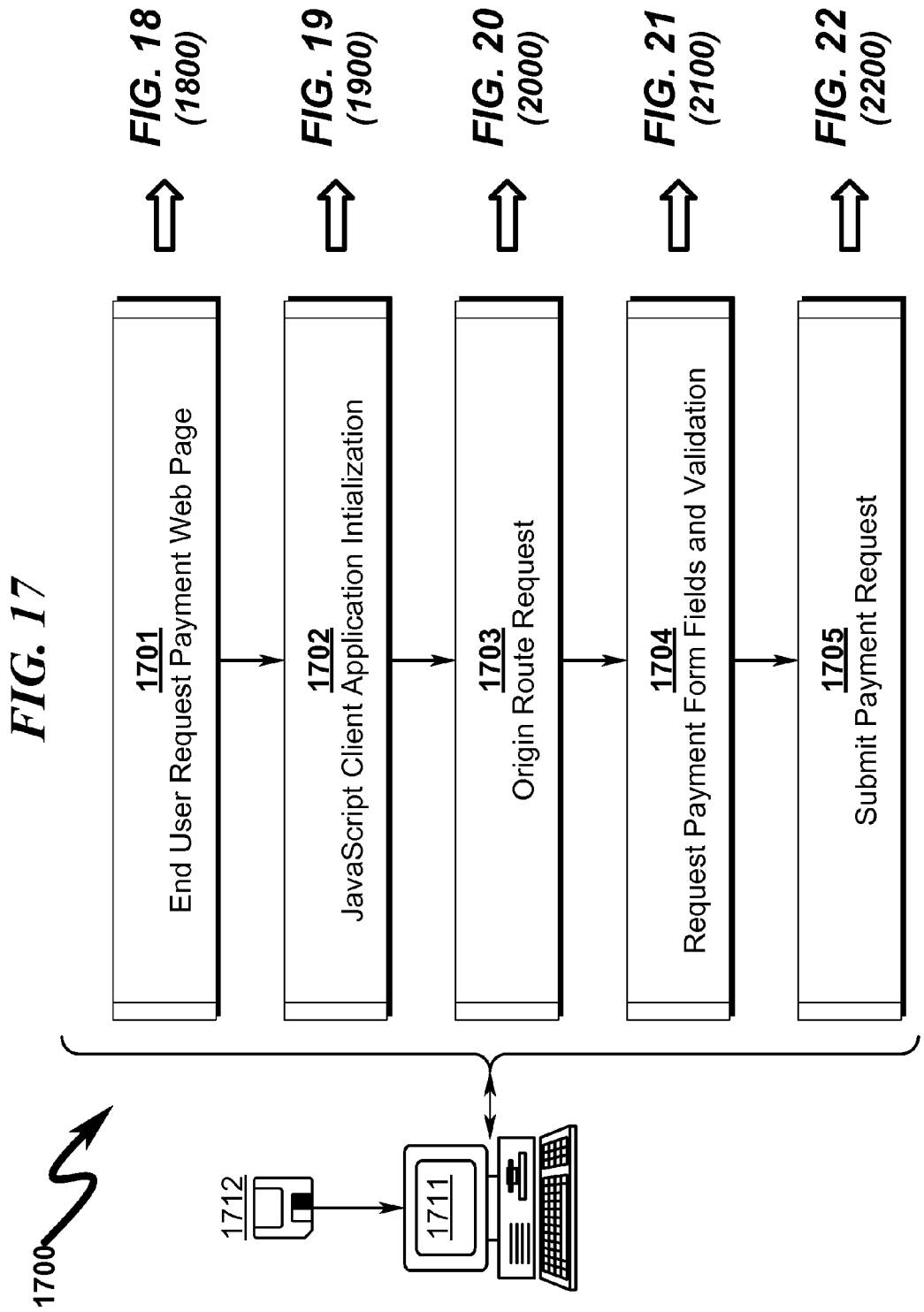
FIG. 17 illustrates an overview of the method for making a cross domain payment request.

Within the present invention system context, an exemplary embodiment of the Cross Domain Payment Processing Method Overview is generally illustrated in FIG. 17 (1700) wherein the web browser starts the process by making a request for a web page from the origin domain web server to initiate a payment request (1701). The origin domain web page contains a reference to the JavaScript client application (1702) which is retrieved and initialized by the web browser. The JavaScript application then makes a client route request (1703) to the cross domain web server to retrieve navigation information for the origin website. The JavaScript client application also makes a request for the payment form fields and validation to allow the end user to complete a payment request (1704). The payment request is then completed by the end user in their browser in the origin domain web page and submitted. The JavaScript application handles the submission process cross domain to the cross domain payment server (1705).

Figure 18:
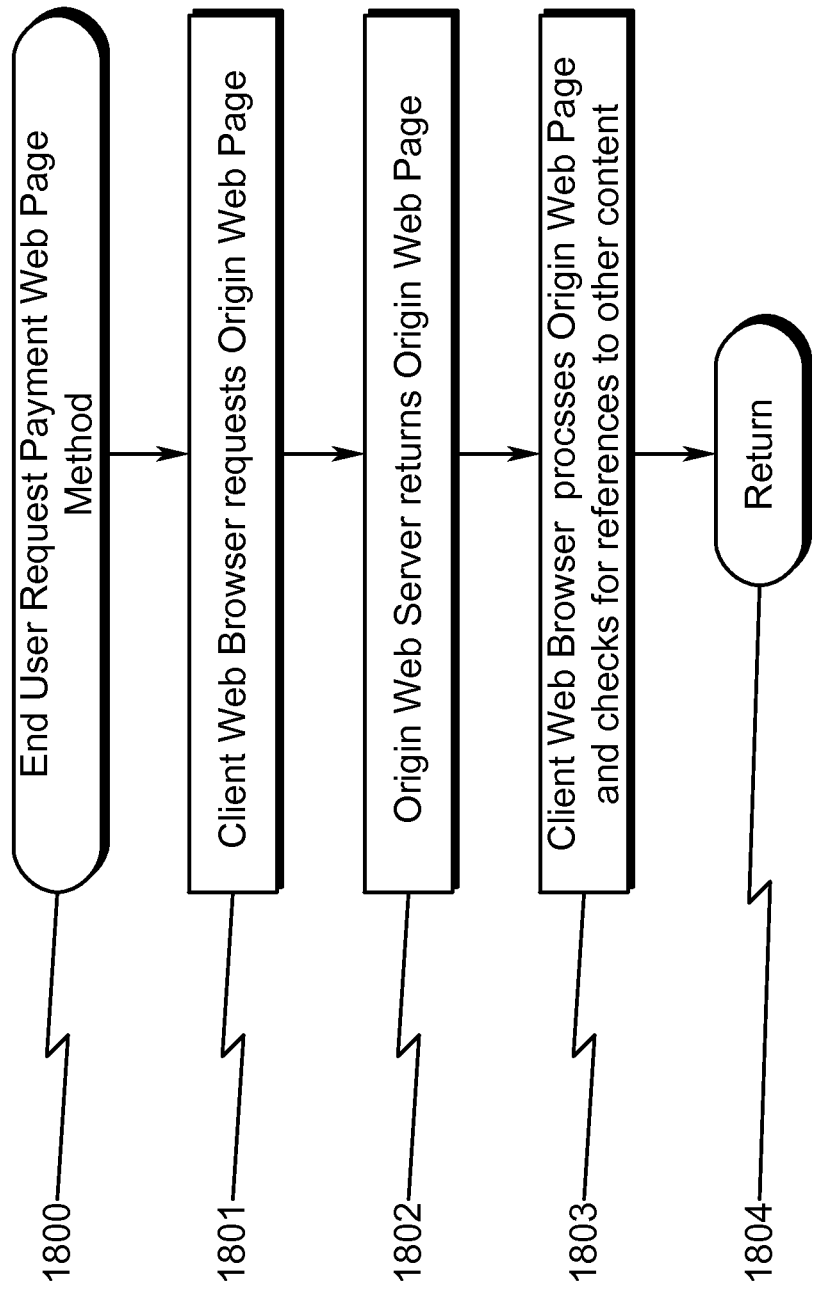
FIG. 18 illustrates an exemplary method of an end user requesting a payment web page from the origin domain web server.
Figure 19:
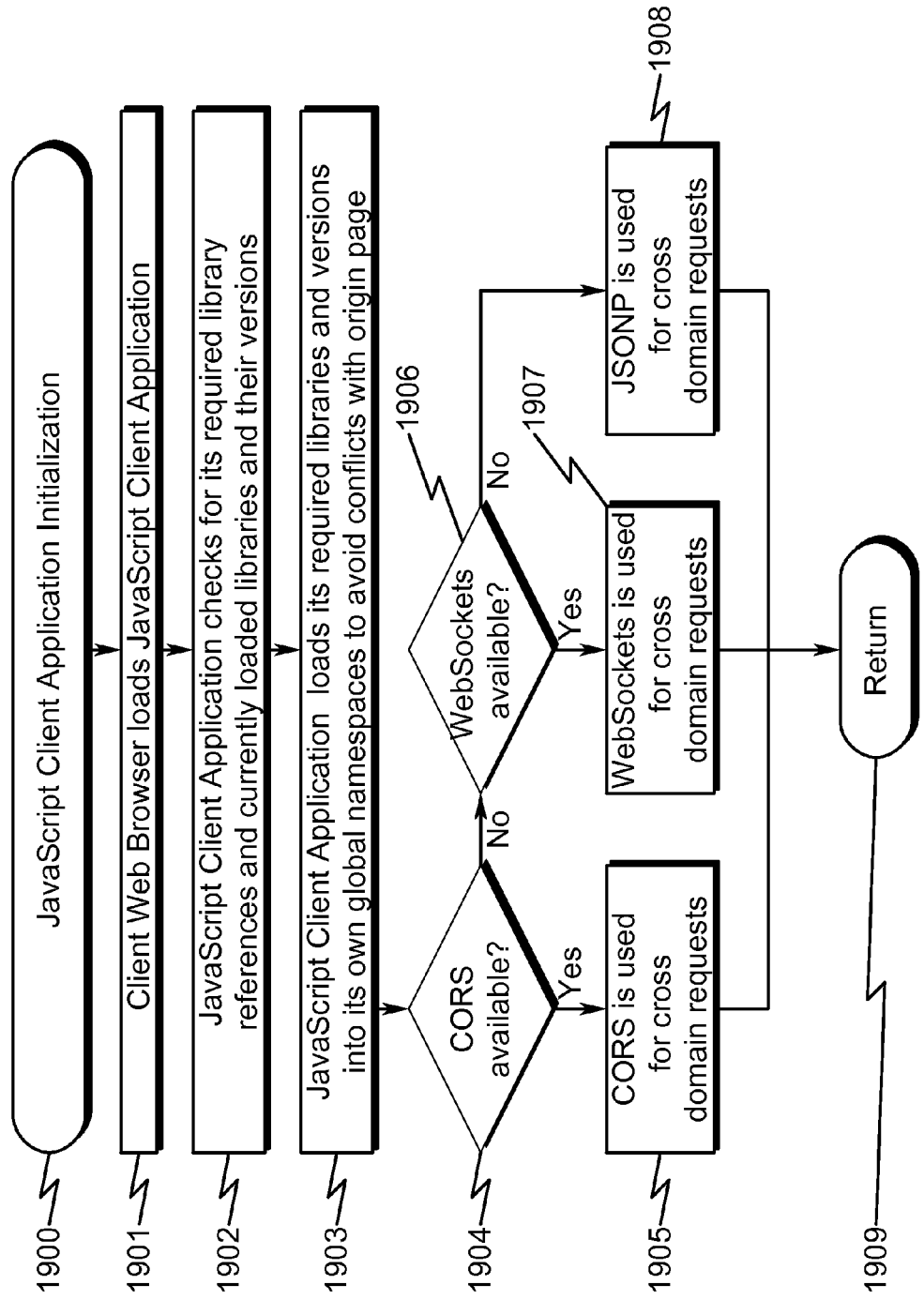
FIG. 19 illustrates the process of retrieving the JavaScript client application and the JavaScript client application initializing in the client device web browser.
Figure 20:
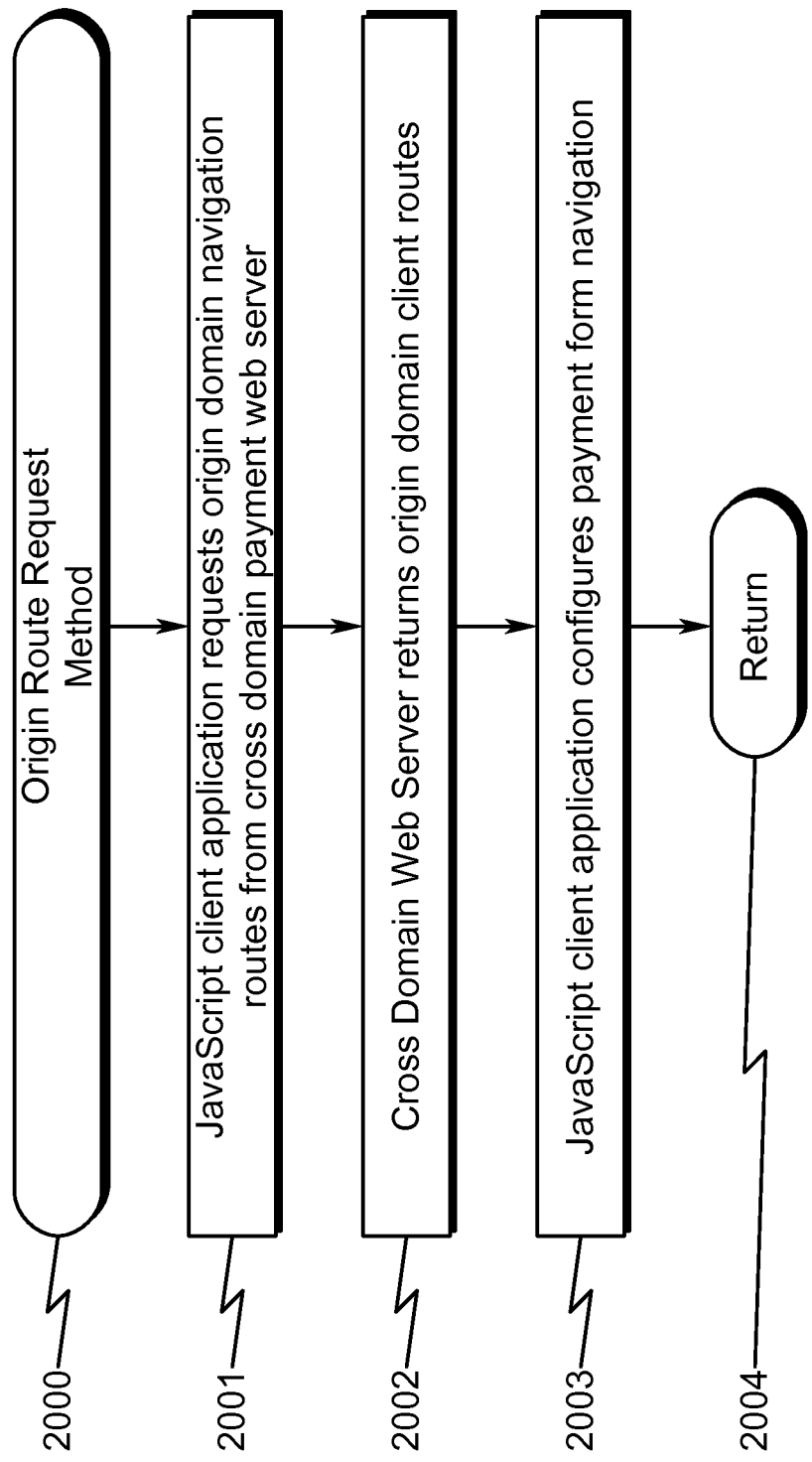
FIG. 20 illustrates the process of requesting the origin domain routes which are used to handle navigation from the payment form to item detail and payment acknowledgement and receipting.
Figure 21:
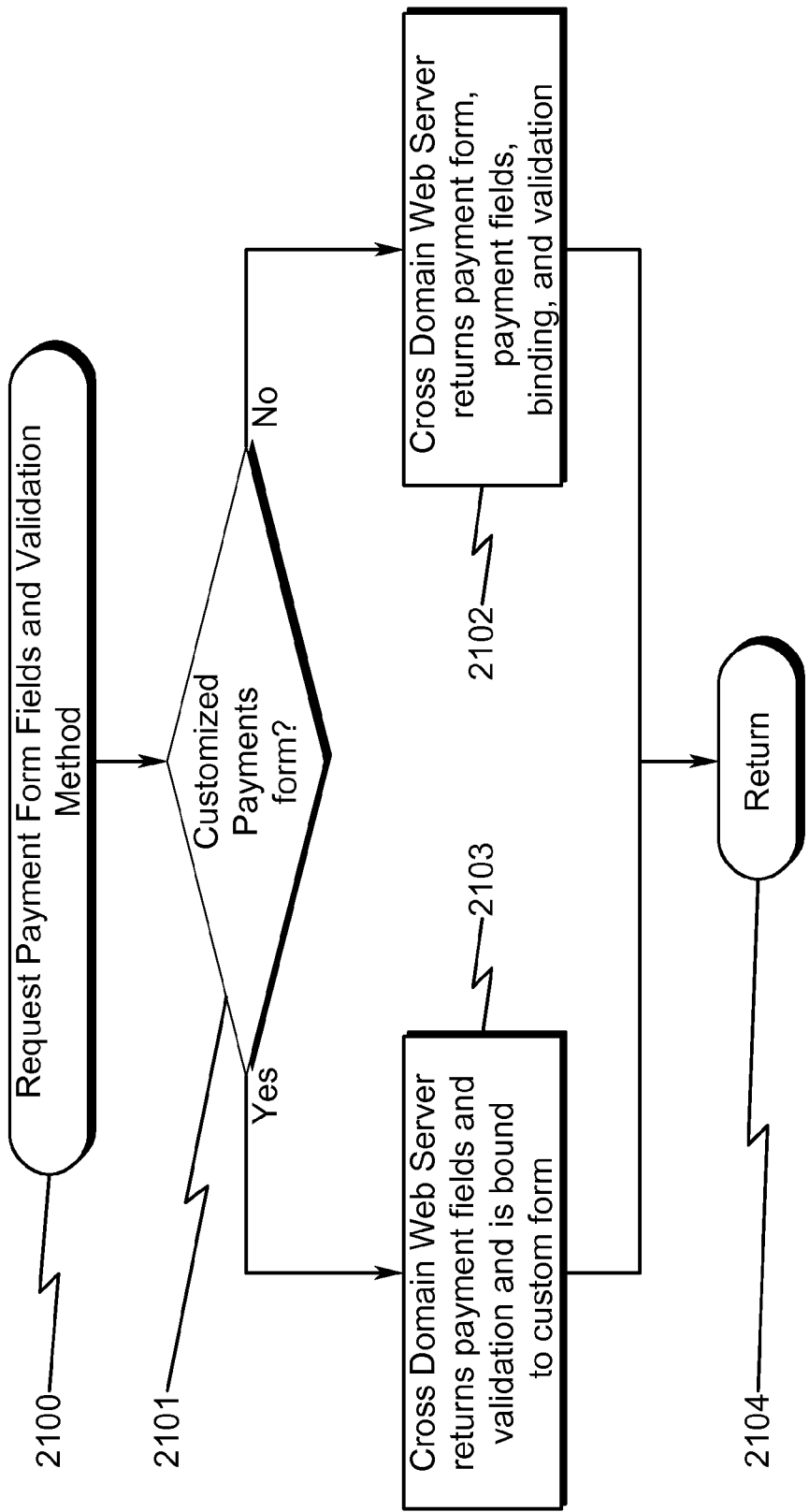
FIG. 21 illustrates the process of requesting a payment form and validation cross domain and rendering it within the origin web page.

This general method outline may be implemented in a variety of ways, with several preferred exemplary embodiments of the submodules described in FIG. 17 (1700) provided in FIG. 18 (1800), FIG. 19 (1900), FIG. 20 (2000), FIG. 21 (2100), FIG. 22 (2200). These exemplary submodule embodiments are detailed in the following sections.

End User Payment Request Method (1800)

Within the present invention system context, an exemplary embodiment of the Cross Domain Payment Processing system is generally illustrated in FIG. 18 (1800) wherein the web browser makes a request for the origin web page to make a payment request (1801). The origin web server returns the web page to the web browser (1802). The web browser begins to load the web page and the browser shows a URL that is from the origin web server. The web browser then checks for references to other content and retrieves all externally referenced content (1803) including the cross domain JavaScript client application. Once the content is downloaded the method ends (1804) and subsequently the JavaScript client application is initialized.

JavaScript Client Initialization Method (1900)

Within the present invention system context, an exemplary embodiment of the method of the JavaScript Initialization Method is generally illustrated in FIG. 19 (1900) wherein after the browser has retrieved the JavaScript client application the browser loads the JavaScript client application (1901). The JavaScript client application when initializing checks the origin web page for existing JavaScript references to determine what libraries that it depends on are loaded (1902). The existing library check generally serves two purposes. Firstly, the JavaScript client should not interfere with the origin web server designed content. Secondly, the JavaScript client should not retrieve libraries that are already loaded resulting in extra HTTP/HTTP requests that could increase page load time. The JavaScript client application loads any libraries it requires into a separate namespace and closure to prevent any potential conflicts with late running scripts included in the origin domain web page (1903). By keeping its dependencies separate from the origin domain web page, the JavaScript client application is able to peacefully coexist with the origin web design.

The JavaScript client application then assesses the browser it is running in to determine what cross domain request capabilities are available (1904). The most supported mechanism available for cross domain requests is JSONP which is supported by older more commonly installed web browsers. Newer mechanisms have been released in the latest versions of web browsers for CORS and WebSockets which also could be used for cross domain requests. The JavaScript client application will select the most current and secure method for cross domain requests. First the JavaScript client application will check to see if CORS is available (1904). If CORS is available, all cross domain communication will use CORS (1905). If CORS is not available, the JavaScript client application will check to see if WebSockets is available (1906). If WebSockets is available, all cross domain communication will use WebSockets (1907). If WebSockets is not available the JavaScript client application will use JSONP for cross domain requests (1908).

Once the communication mechanism for cross domain requests is known, the JavaScript client application will then return (1909) and request origin web routes using the selected cross domain communication mechanism.

Origin Route Request Method (2000)

Within the present invention system context, an exemplary embodiment of the Origin Route Request Method is generally illustrated in FIG. 20 (2000) wherein the JavaScript client application makes a cross domain request for the origin domain routes to provide navigation related to payment requests (2001). The cross domain payment web server returns the routes to the JavaScript client application (2002). The JavaScript client application configures navigation based on the routes (2003) and then returns (2004).

Request Payment Form Fields and Validation Method (2100)

Within the present invention system context, an exemplary embodiment of the Request Payment Form Fields and Validation Method is generally illustrated in FIG. 21 (2100) wherein the JavaScript client application determines if the payment request uses a standard form provided by the cross domain payment web server or if the origin web server is providing the payment request form (2101). If the payment form is being provided by the cross domain payment web server, the JavaScript client application requests the payment fields, the payment field validation, and the HTML form to inject the payment form into the target HTML container defined on the origin web page (2102). If the payment form is being provided by the origin web server and is already in the page, the JavaScript client application retrieves the field validation and fields from the cross domain web payment server to be bound to the origin web domain provided payment form (2103). At this point the origin web page for a payment request is finished rendering and presented to the end user in their browser (2104).

Submit Payment Request Method (2200)

Within the present invention system context, an exemplary embodiment of the Submit Payment Request Method is generally illustrated in FIG. 22 (2200) wherein the end user completes the payment request form and submits the payment request (2201). The JavaScript client application then validates the payment information (2202). If the client validation passes (2203) the JavaScript client application submits the payment request cross domain to the cross domain payment web server (2204). If the client validation is not passed, the JavaScript client application provides the errors and feedback to the end user for correction (2205). Once the payment request is submitted to the cross domain payment web server (2204), the cross domain payment web server will attempt to process the payment. If the payment is successful (2206) a success message is returned to the JavaScript client application (2207). Otherwise, the JavaScript application will receive errors that are presented to the end user for correction (2205). If the JavaScript client application receives a success message from the cross domain payment web server, the JavaScript client application takes the browser to the payment acknowledgement page on the origin web server (2207).

Exemplary JavaScript Code Implementation (2300)

While the present invention may be implemented in a wide variety of configurations, in several preferred embodiments JavaScript is utilized as the predominate software coding language. FIG. 23 (2500) illustrates an exemplary HTML code fragment that would be inserted into the Origin Domain Website HTML in order to implement a secure transaction processing system/method in a typical Origin Domain Web Page. This sample HTML illustrates that the amount of code development for the Origin Domain Website is trivial and as such the disclosed secure transaction processing functionality can be easily implemented with little or no technical support required by the Origin Domain Web Page software engineering support staff.

Exemplary Transaction Processing GUI Display (2400)

Figure 24:
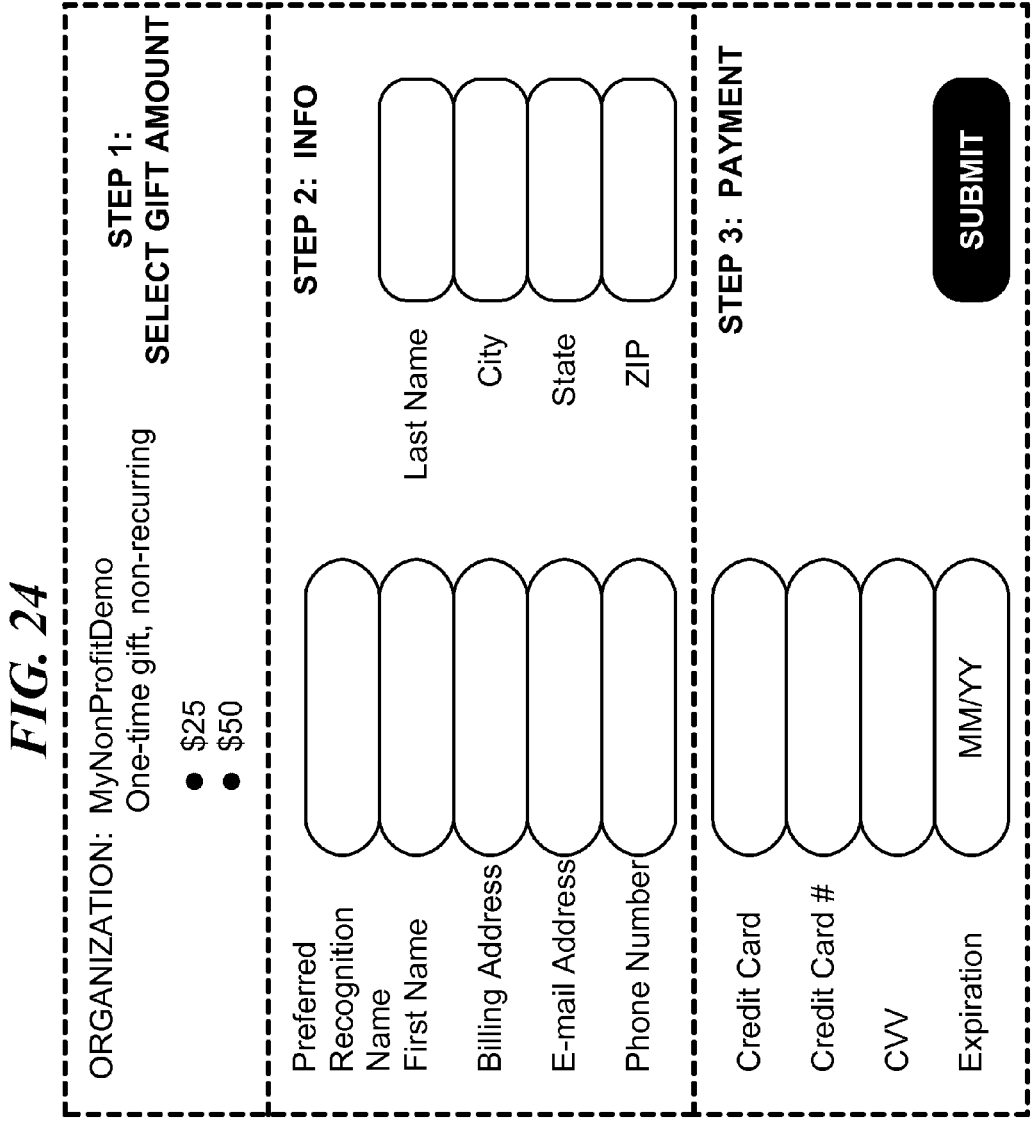
FIG. 24 illustrates an exemplary secure transaction processing GUI dialog as generated by a preferred embodiment of the present invention.

While the present invention may implement the details of the transaction processing GUI portion of the user interface in a wide variety of ways, one preferred embodiment of a web page illustrating a typical graphical user interface (GUI) display is generally illustrated in FIG. 24 (2400). This exemplary transaction processing screen interface illustrates how the context associated with the Origin Domain Web Page may be integrated into the framework of the transaction processing screen so that the user/customer of the system/method has no knowledge that they have left the control of their Origin Web Page to actually complete the financial transaction in a secure fashion. This transparency of operation is a very useful feature of the present invention in that it permits extension of the contextual "umbrella" of the Origin Domain Web Page to other functionality not directly associated with (or maintained by) the Origin Domain Web Page.

System Summary

The present invention system anticipates a wide variety of variations in the basic theme of construction, but can be generalized as a secure transaction processing system comprising:
(a) browser based client application;
(b) web server application; and
(c) third party website navigation instructions;
wherein
the web browser based client application requests transaction processing forms from a web server via cross domain requests;
the web server application provides the forms to the browser via cross domain requests;
the browser based client application program detects and manages conflicts of style and existing client side behavior and renders via cross domain requests using third party provided styles within a third party web page in the web browser;
the browser based client application submits the payment forms via cross domain requests;
the web server application accepts and processes the payment forms and provides validation results and transaction results;
the third party website navigation instructions are determined based on whether or not the transaction results were successful; and
the browser based client application, the web server application, and the third party website navigation instructions are embodied in one or more computer systems linked via a computer network.

This general system summary may be augmented by the various elements described herein to produce a wide variety of invention embodiments consistent with this overall design description.

Alternative System Summary

The present invention system anticipates a wide variety of variations in the basic theme of construction, but can be also be generalized as a secure transaction processing system comprising:
(a) browser based client application;
(b) web server application; and
(c) third party website navigation instructions;
wherein
the web browser based client application requests credit card and ACH processing HTML/XHTML forms from a web server via cross domain requests using an HTTP or HTTPS connection via AJAX;
the web server application provides the HTML/XHTML forms to the browser via cross domain requests using an HTTP or HTTPS connection;
the browser based client application program detects and manages conflicts of style and existing client side behavior and renders via cross domain requests via a HTTP/HTTPS connection using third party provided styles within a third party web page in the web browser;
the browser based client application submits the payment forms via cross domain requests using an HTTP/HTTPS connection;
the web server application accepts and processes the payment forms and provides validation results and transaction results;
the third party website navigation instructions are determined based on whether or not the transaction results were successful; and
the browser based client application, the web server application, and the third party website navigation instructions are embodied in one or more computer systems linked via a computer network.

This general system summary may be augmented by the various elements described herein to produce a wide variety of invention embodiments consistent with this overall design description.

Method Summary

The present invention method anticipates a wide variety of variations in the basic theme of implementation, but can be generalized as a secure transaction processing method comprising:
(6) invoking a request for a web page from an origin domain website residing on an origin domain web server to initiate a payment request;
(7) referencing a client application within the web page that is retrieved and initialized by a web browser;
(8) invoking a client route request to a cross domain web server using a cross domain request to retrieve navigation information for the origin domain website via the client application;
(9) invoking request for payment form fields and validation to allow an end user to complete the payment request via the client application; and

(10) completing the payment request by the end user in the browser in the origin domain web page and submitting the payment request to a cross domain payment web server using a cross domain request via the client application;

wherein the steps are performed by one or more computer systems linked via a computer network.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the client application comprises JavaScript code sequences.

An embodiment wherein the cross domain requests comprise WebSockets communication.

An embodiment wherein the cross domain requests comprise JSONP communication.

An embodiment wherein the cross domain requests comprise CORS communication.

An embodiment wherein the client application is hosted by the origin domain web server.

An embodiment wherein the client application is hosted by the cross domain payment web server.

An embodiment wherein an alternate form of cross domain communication is used.

An embodiment wherein the JavaScript application is used to send and receive XML data cross domains.

An embodiment wherein the JavaScript application is used to send and receive Name Value Pair based data.

An embodiment wherein the JavaScript application is used to send and receive SOAP messages.

An embodiment wherein the JavaScript application is hosted by the origin web server but makes requests to the cross domain payment web server.

An embodiment wherein the client routes are hosted by the origin web server.

An embodiment wherein the payment form templates for the payment form are hosted on the origin web server.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention.

CONCLUSION

The disclosed secure transaction processing system and method provides an exemplary system/methodology to inject and submit payment forms into a web page via a JavaScript based application utilizing CORS, WebSockets, or JSONP. The browser based JavaScript client detects and manages style and behavior conflicts with the payment form to render the payment forms within in a web page. The JavaScript web browser application then submits the forms via a selected Cross Domain Request communication method to the web server which processes the transaction and instructs the web browser application where to navigate to next within origin domain website.

More generally, a secure transaction processing system/method allowing injection and execution of credit card and ACH payment forms in a third party web page via cross domain requests has been disclosed. The system/method provides a mechanism to inject and execute payment forms into a third (customer) party's website via Cross Domain Requests by providing a set of client application instructions that retrieves presentation and behavior logic and delivers it in a third party application. A browser based client application detects and manages style and behavior conflicts to render forms within in an existing third party web page. The client application then submits the forms via Cross Domain Requests to the transaction processing web server and directs the client application to a new navigation target within the third party website.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A computer-implemented secure transaction processing system comprising networked computing devices executing software, and further comprising:

(a) an origin domain server hosting a web browser based client application (WBA) accessible by a user using a network-connected remote device via a graphical user interface (GUI);

(b) a transaction processing server, having a domain distinct from a domain of said origin domain server, hosting a web server application (WSA) configured for use in processing payment transactions; and (c) third party website navigation instructions (WNI);

wherein said WBA is configured to request transaction processing forms (TPF) from said WSA via cross domain requests in response to accessing said WBA by the user;

said WBA is operable on said origin domain server via use of a web browser and without the use of third-party software;

said WSA is configured to provide said TPF to said WBA via cross domain requests in response to said request;

said WSA is configured to utilize CORS for communication of said cross domain requests if CORS is available;

said WSA is configured to utilize WebSockets for communication of said cross domain requests if CORS is not available and WebSockets is available;

said WSA is configured to utilize JSONP for communication of said cross domain requests if CORS is not available and WebSockets is not available;

said WBA is configured to detect and manage conflicts of style and existing client side behavior;

said WBA is configured to render via cross domain requests a third party web page including said TPF in a web browser using third party provided styles within said third party web page;

said WBA is configured to submit said TPF to said WSA via cross domain request in response to filling of said TPF by said user;

said WBA is configured to accept and processes said filled TPF to provide validation results and transaction results; and said WBA is configured to execute said WNI to define user navigation within said WBA based on whether or not said transaction results were successful.

2. The secure transaction processing system of claim 1 wherein said WBA comprises JavaScript code sequences.

3. The secure transaction processing system of claim 1 wherein said WBA is hosted by an origin domain web server.

4. The secure transaction processing system of claim 1 wherein said WBA is hosted by a cross domain payment web server.

5. The secure transaction processing system of claim 1 wherein said WSA is hosted by a cross domain payment web server.

6. A computer-implemented secure transaction processing system comprising networked computing devices executing software, and further comprising:
   (a) an origin domain server hosting a web browser based client application (WBA) accessible by a user using a network-connected remote device;
   (b) a transaction processing server, having a domain distinct from a domain of said origin domain server, hosting a web server application (WSA) configured for use is processing payment transactions; and
   (c) third party website navigation instructions (WNI);
wherein
said WBA is configured to request credit card and ACH processing HTML or XHTML transaction processing forms (TPF) from said WSA via cross domain requests in response to accessing said WBA by said user and using an HTTP or HTTPS connection via AJAX;

said WBA is operable on said origin domain server via use of a web browser and without the use of third-party software;

said WSA is configured to provide said HTML or said XHTML TPF to said WBA via cross domain requests using an HTTP or HTTPS connection in response to said request;

said WBA is configured to detect and manage conflicts of style and existing client side behavior;

said WBA is configured to render via cross domain requests via a HTTP or HTTPS connection a third party web page including said HTML or XHTML TPF in a web browser using third party provided styles within said third party web page;

said WBA is configured to submit said HTML or XHTML TPF to said WSA via cross domain requests using an HTTP or HTTPS connection in response to filling of said TPF by said user;

said WSA is configured to accept and process said filled TPF to provide validation results and transaction results;

said WBA is configured to execute said WNI to define user navigation within said WBA based on whether or not said transaction results were successful.

7. The secure transaction processing system of claim 6 wherein said WBA comprises JavaScript code sequences.

8. The secure transaction processing system of claim 6 wherein said WBA is hosted by an origin domain web server.

9. The secure transaction processing system of claim 6 wherein said WBA is hosted by a cross domain payment web server.

10. The secure transaction processing system of claim 6 wherein said WSA is hosted by a cross domain payment web server.

11. A secure transaction processing method comprising:
   (1) requesting, via a web browser operating on a computer system under control of a graphical user interface (GUI) executed within an operating system running under control of said computer system, a web page from an origin domain website (ODW) residing on an origin domain web server (ODWS) to initiate a payment request;
   (2) referencing a web browser based client application (WBA) within said web page that is retrieved from said ODWS and initialized by said web browser;
   (3) executing on said web browser a client route request to a cross domain web server (CDWS), having a domain distinct from said ODW, using a cross domain request (CDR) to retrieve third party website navigation (WNI) for said ODW via said WBA;
   (4) executing on said web browser a request for payment form fields and validation to allow an end user to complete said payment request via said WBA; and
   (5) completing said payment request made by said end user in said browser in said web page of said ODW and submitting said payment request to a cross domain payment web server (CDPS) using a cross domain request via said WBA;
wherein
said WBA is utilizing CORS for communication of said cross domain requests if CORS is available;

said WBA is utilizing WebSockets for communication of said cross domain requests if CORS is not available and WebSockets is available;

said WBA is utilizing JSONP for communication of said cross domain requests if CORS is not available and WebSockets is not available; and said web page is operable on said web browser without the use of third-party software.

12. The secure transaction processing method of claim 11 wherein said WBA comprises JavaScript code sequences.

13. The secure transaction processing method of claim 11 wherein said WBA is hosted by said ODWS.

14. The secure transaction processing method of claim 11 wherein said WBA is hosted by said CDPS.

15. A tangible non-transitory computer usable medium having computer-readable program code mean embodied therein for causing a computer to execute a secure transaction processing method, said method comprising:
   (1) requesting, via a web browser operating on a computer system under control of a graphical user interface (GUI) executing within an operating system running under control of said computer system, a web page from an origin domain website (ODW) residing on an origin domain web server (ODWS) to initiate a payment request;
   (2) referencing a web browser based client application (WBA) within said web page that is retrieved from said ODWS and initialized by said web browser;
   (3) executing on said web browser a client route request to a cross domain web server (CDWS), having a domain distinct from said ODW, using a cross domain request (CDR) to retrieve third party website navigation instructions (WNI) for said ODW via said WBA;

(4) executing on said web browser a request for payment form fields and validation to allow an end user to complete said payment request via said WBA; and (5) completing said payment request made by said end user in said browser in said web page of said ODW and submitting said payment request to a cross domain payment web server (CDPS) using a cross domain request via said WBA;

wherein said WBA is utilizing CORS for communication of said cross domain requests if CORS is available;

said WBA is utilizing WebSockets for communication of said cross domain requests if CORS is not available and WebSockets is available;

said WBA is utilizing JSONP for communication of said cross domain requests if CORS is not available and WebSockets is not available; and said web page is operable on said web browser without the use of third-party software.

16. The computer usable medium of claim 15 wherein said WBA comprises JavaScript code sequences.

17. The computer usable medium of claim 15 wherein said WBA is hosted by said origin domain web server.

18. The computer usable medium of claim 15 wherein said WBA is hosted by said cross domain payment web server.

\* \* \* \* \*